(12) United States Patent
Smith et al.

(10) Patent No.: US 9,083,600 B1
(45) Date of Patent: Jul. 14, 2015

(54) PROVIDING PRESENCE INFORMATION WITHIN DIGITAL ITEMS

(75) Inventors: Brent Russell Smith, Redmond, WA (US); Tom Killalea, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 36 days.

(21) Appl. No.: 12/260,713

(22) Filed: Oct. 29, 2008

(51) Int. Cl.
*G06F 15/173* (2006.01)
*H04L 12/26* (2006.01)

(52) U.S. Cl.
CPC ..................... *H04L 43/00* (2013.01)

(58) Field of Classification Search
CPC ....... H04L 67/306; H04L 67/22; H04L 65/00; H04L 65/403
USPC .................................................. 709/223–224
See application file for complete search history.

(56) References Cited

U.S. PATENT DOCUMENTS

| | | | |
|---|---|---|---|
| 5,146,552 A | | 9/1992 | Cassorla et al. |
| 5,337,407 A | * | 8/1994 | Bates et al. .................... 715/751 |
| 5,764,345 A | | 6/1998 | Fladd et al. |
| 5,960,173 A | * | 9/1999 | Tang et al. ..................... 709/201 |
| 6,714,791 B2 | * | 3/2004 | Friedman ................... 455/456.1 |
| 7,076,546 B1 | * | 7/2006 | Bates et al. .................... 709/224 |
| 7,103,848 B2 | | 9/2006 | Barsness et al. |
| 7,107,533 B2 | | 9/2006 | Duncan et al. |
| 7,246,118 B2 | | 7/2007 | Chastain et al. |
| 7,257,769 B2 | * | 8/2007 | Caspi ............................ 715/233 |
| 7,418,656 B1 | | 8/2008 | Petersen |
| 7,512,653 B2 | * | 3/2009 | Krishnasamy et al. ....... 709/204 |
| 7,543,237 B2 | * | 6/2009 | Kontny et al. ................. 715/759 |
| 7,669,213 B1 | * | 2/2010 | Wick et al. ....................... 725/37 |
| 7,779,347 B2 | | 8/2010 | Christiansen et al. |
| 7,921,309 B1 | | 4/2011 | Isbister et al. |
| 8,261,182 B1 | | 9/2012 | Petersen |
| 8,436,911 B2 | | 5/2013 | Leebow |
| 8,706,685 B1 | | 4/2014 | Smith et al. |
| 2001/0007980 A1 | | 7/2001 | Ishibashi et al. |
| 2002/0035697 A1 | | 3/2002 | McCurdy et al. |
| 2002/0049787 A1 | | 4/2002 | Keely et al. |
| 2002/0107759 A1 | | 8/2002 | An |
| 2002/0120635 A1 | * | 8/2002 | Joao ............................. 707/200 |
| 2002/0152215 A1 | | 10/2002 | Clark et al. |
| 2002/0178163 A1 | * | 11/2002 | Mayer ............................ 707/10 |

(Continued)

OTHER PUBLICATIONS

Robert S. Fish, Robert E. Kraut, Mary D. P. Leland, and Michael Cohen, "Quilt: a collaborative tool for cooperative writing", 1998, ACM, pp. 30-37.*

(Continued)

*Primary Examiner* — Hua Fan
(74) *Attorney, Agent, or Firm* — Lee & Hayes, PLLC

(57) ABSTRACT

Providing presence information within digital items is described. In one example, a server system receives presence information from a plurality of client devices. The presence information indicates a portion of a digital item associated with at least one user of each respective client device. The server system also receives a user identification request from a requesting client device to identify one or more users of the plurality of client devices associated with a particular portion of the digital item. Additionally, the server system identifies a user of a particular client device associated with the particular portion of the digital item based on the presence information of the particular client device and sends an identifier of the user of the particular client device to the requesting client device.

31 Claims, 13 Drawing Sheets

(56) References Cited

U.S. PATENT DOCUMENTS

| | | | |
|---|---|---|---|
| 2003/0084404 | A1 | 5/2003 | Dweck et al. |
| 2004/0008970 | A1* | 1/2004 | Junkersfeld et al. ............ 386/69 |
| 2004/0098275 | A1 | 5/2004 | Hubert |
| 2004/0098280 | A1 | 5/2004 | Hubert |
| 2004/0261016 | A1 | 12/2004 | Glass et al. |
| 2005/0108556 | A1 | 5/2005 | DeMello et al. |
| 2005/0132281 | A1 | 6/2005 | Pan et al. |
| 2005/0193330 | A1 | 9/2005 | Peters |
| 2006/0020882 | A1 | 1/2006 | Beezer et al. |
| 2006/0053364 | A1 | 3/2006 | Hollander et al. |
| 2006/0071754 | A1 | 4/2006 | Tofts et al. |
| 2006/0075205 | A1 | 4/2006 | Martin et al. |
| 2006/0085735 | A1 | 4/2006 | Shimizu |
| 2006/0098900 | A1 | 5/2006 | King et al. |
| 2006/0161578 | A1 | 7/2006 | Siegel et al. |
| 2007/0055926 | A1* | 3/2007 | Christiansen et al. ........ 715/512 |
| 2007/0078965 | A1* | 4/2007 | Shimamura et al. .......... 709/224 |
| 2007/0234140 | A1 | 10/2007 | Lee et al. |
| 2008/0092181 | A1 | 4/2008 | Britt |
| 2008/0098294 | A1 | 4/2008 | Le |
| 2008/0154908 | A1 | 6/2008 | Datar et al. |
| 2008/0168073 | A1* | 7/2008 | Siegel et al. .................. 707/100 |
| 2008/0195657 | A1 | 8/2008 | Naaman et al. |
| 2008/0201632 | A1 | 8/2008 | Hong et al. |
| 2008/0222295 | A1* | 9/2008 | Robinson et al. ............. 709/227 |
| 2008/0227074 | A1 | 9/2008 | Johnson |
| 2009/0005990 | A1 | 1/2009 | Anderson et al. |
| 2009/0157522 | A1 | 6/2009 | Srinivasan et al. |
| 2009/0199082 | A1 | 8/2009 | Hollander et al. |
| 2009/0204882 | A1 | 8/2009 | Hollander et al. |
| 2009/0210244 | A1 | 8/2009 | Koister et al. |
| 2009/0271381 | A1 | 10/2009 | Beezer et al. |
| 2009/0287714 | A1 | 11/2009 | Vasudevan et al. |
| 2010/0057714 | A1 | 3/2010 | Miedema |
| 2010/0070845 | A1 | 3/2010 | Facemire et al. |
| 2010/0205105 | A1 | 8/2010 | Robertson et al. |
| 2010/0278453 | A1 | 11/2010 | King |
| 2011/0087955 | A1 | 4/2011 | Ho et al. |
| 2011/0173141 | A1 | 7/2011 | Campbell et al. |
| 2011/0196863 | A1 | 8/2011 | Marcucci et al. |
| 2011/0225192 | A1 | 9/2011 | Imig et al. |
| 2011/0282866 | A1 | 11/2011 | Erickson et al. |
| 2012/0036423 | A1 | 2/2012 | Haynes, II et al. |
| 2012/0084634 | A1 | 4/2012 | Wong et al. |
| 2012/0150859 | A1 | 6/2012 | Hu |
| 2012/0173642 | A1 | 7/2012 | Rosenberger |
| 2012/0210203 | A1 | 8/2012 | Kandekar et al. |
| 2012/0221938 | A1 | 8/2012 | Patterson et al. |
| 2012/0254304 | A1 | 10/2012 | Anbalagan et al. |
| 2013/0021281 | A1 | 1/2013 | Tse et al. |
| 2013/0104028 | A1 | 4/2013 | Murray et al. |
| 2013/0166471 | A1 | 6/2013 | Fukuda Kelley et al. |
| 2013/0325870 | A1 | 12/2013 | Rouse et al. |
| 2014/0115439 | A1 | 4/2014 | Delpha et al. |

OTHER PUBLICATIONS

International Search Report, Application No. PCT/US/08/57829, filed Mar. 21, 2008, 2 pages.
U.S. Appl. No. 12/240,842, Curtis, Michael G.
"Book Clubs Barnes and Noble", retrievced from: http://www.barnesandnoble.com/bookclubs/ on Jan. 30, 2009, 1 page.
"Borders Book Club Resources", retreived from: http://www.bordersmedia.com/bookclubsidefault.asp on Jan. 30, 2009, 3 pages.
"Book clubs on and offline", retrieved from: http://www.chistell.com/book_clubs.htm on Jan. 30, 2009. 3 pages.
"General Interest Online Book Clubs and Web-based Book Discussion", retrieved from: http://www.book-clubs-resource.com/online/general.php on Jan. 30, 2009, 3 pages.
"Internet Book Clubs and Discussion Groups", retrieved from: http://www.monroe.lib.in.us/fiction/inbookclubs.html on Jan. 30, 2009, 1 page.
"Oprah's Book Club", retrieved from: http://www.oprah.com/entity/oprahsbookclub on Jan. 30, 2009, 1 page.
"Reader's Circle Author chats", retrieved from: http://www.randomhouse.com/rhpg/rc/author_chats/index.html on Jan. 30, 2009, 1 page.
"Reader's Paradise Forum—Garden Web", retrieved from: http://glyphs.gardenweb.com/forums/paradise/ on Jan. 30, 2009, 1 page.
"Salon Table Talk—Books ", retreived from: http://tabletalk.salon.com/webx?13@114.sxcAajHRfod.0@.ee6ced0 on Jan. 30, 2009, 4 pages.
SeniorNet—SeniorNet Books & Literature, retreived from: http://www.seniornet.org/jsnet/index.php?option=com_content&task=view&id=363&Itemid=37 on Jan. 30, 2009, 2 pages.
"ShakespeareHigh.com" Billy's book club, retrieved from: http://www.shakespearehigh.com/cafeteria/index.php?PHPSESSID=a5d84904c94dbba0197c4724a1344c91&board=57.0 on Jan. 30, 2009, 1 page.
"The Bookies: An online book discussion group", retrieved from: http://www.geocities.com/bookiestoo/ on Jan. 30, 2009, 1 page.
"Vintage Reading Group Center", retrieved from: http://www.randomhouse.com/vintage/read/rgg.html on Jan. 30, 2009, 1 page.
"Yahoo! Groups: Directory : Reading Groups", retrieved from : http://dir.groups.yahoo.com/dir/Entertainment_Arts/Humanities/Books_and_Writing/Reading_Groups on Jan. 30, 2009, 2 pages.
"African American Literature Book Club", retrieved from <<http://www.aalbc.com/>> on Jan. 30, 2009, 4 pages.
U.S. Appl. No. 12/240,842, filed Sep. 29, 2008, Curtis, "Facilitating Discussion Group Formation and Interaction," 64 pages.
U.S. Appl. No. 12/260,764, filed Oct. 29, 2008, Smith et al., "Organizing Collaborative Annotations," 57 pages.
Final Office action for U.S. Appl. No. 12/260,764, mailed on Jan. 19, 2012, Smith et al., "Organizing Collaborative Annotations", 23 pages.
Non-Final Office Action for U.S. Appl. No. 12/260,764, mailed on Jul. 6, 2011, Brent Russell Smith, "Organizing Collaborative Annotations," 31 pages.
Non-Final Office Action for U.S. Appl. No. 12/260,764, mailed on Jun. 13, 2012, Brent Russell Smith et al., "Organizing Collaborative Annotations", 28 pages.
Kolovshi et al., "Towards E-learning via the Semantic Web", International Conference on Computer Systems and Technologies, 2003, 6 pages.
Office action for U.S. Appl. No. 13/077,699, mailed on Nov. 8, 2012, Lynnes et al., "Tagging Annotations of Electronic Books", 14 pages.
Office action for U.S. Appl. No. 12/260,764, mailed on Dec. 21, 2012, Smith et al., "Organizing Collaborative Annotations", 29 pages.
Shelburn, "E-book usage in an academic library: User attitudes and behaviors", Elsevier Inc., Library Collections, Acquisitions, & Technical Services 33, 2009, 14 pages.
Li et al., "Towards Effective Browsing of Large Scale Social Annotations", International World Wide Web Conference Committee, 2007, 10 pages.
Office action for U.S. Appl. No. 12/260,764, mailed on Apr. 11, 2013, Smith et al., "Organizing Collaborative Annotations", 33 pages.
Office action for U.S. Appl. No. 13/077,699, mailed on Apr. 4, 2013, Lynnes et al., "Tagging Annotations of Electronic Books", 18 pages.
Wolfe, "Annotation technologies: A software and research review", Elsevier Science Inc., Computers and Composition 19, 2002, 27 pages.
Office Action for U.S. Appl. No. 13/077,699, mailed on Nov. 21, 2013, Brett N. Lynnes, "Tagging Annotations of Electronic Books", 15 pages.
Office action for U.S. Appl. No. 12/260,764, mailed on Sep. 9, 2013, Smith et al "Organizing Collaborative Annotations", 34 pages.
Office Action for U.S. Appl. No. 13/077,699, mailed on Nov. 6, 2014, Brett N. Lynnes, "Tagging Annotations of Electronic Books", 16 pages.
Final Office Action for U.S. Appl. No. 13/077,699, mailed on May 30, 2014, Brett N. Lynnes, "Tagging Annotations of Electronic Books", 18 pages.

* cited by examiner

PROVIDING PRESENCE INFORMATION WITHIN DIGITAL ITEMS

BACKGROUND

Electronic distribution of media to consumers has become prevalent. For example, consumers have the ability to download digital items including audio media, video media, and text based media, such as electronic books ("eBooks"), to electronic devices. For many consumers, the ability to engage in a discussion and share opinions regarding digital items that have been downloaded can enhance a user's experience with digital items and with electronic devices utilized to access digital items. Enhancing a user's experience may result in additional downloads of digital items and increased use of electronic devices that can access digital items.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
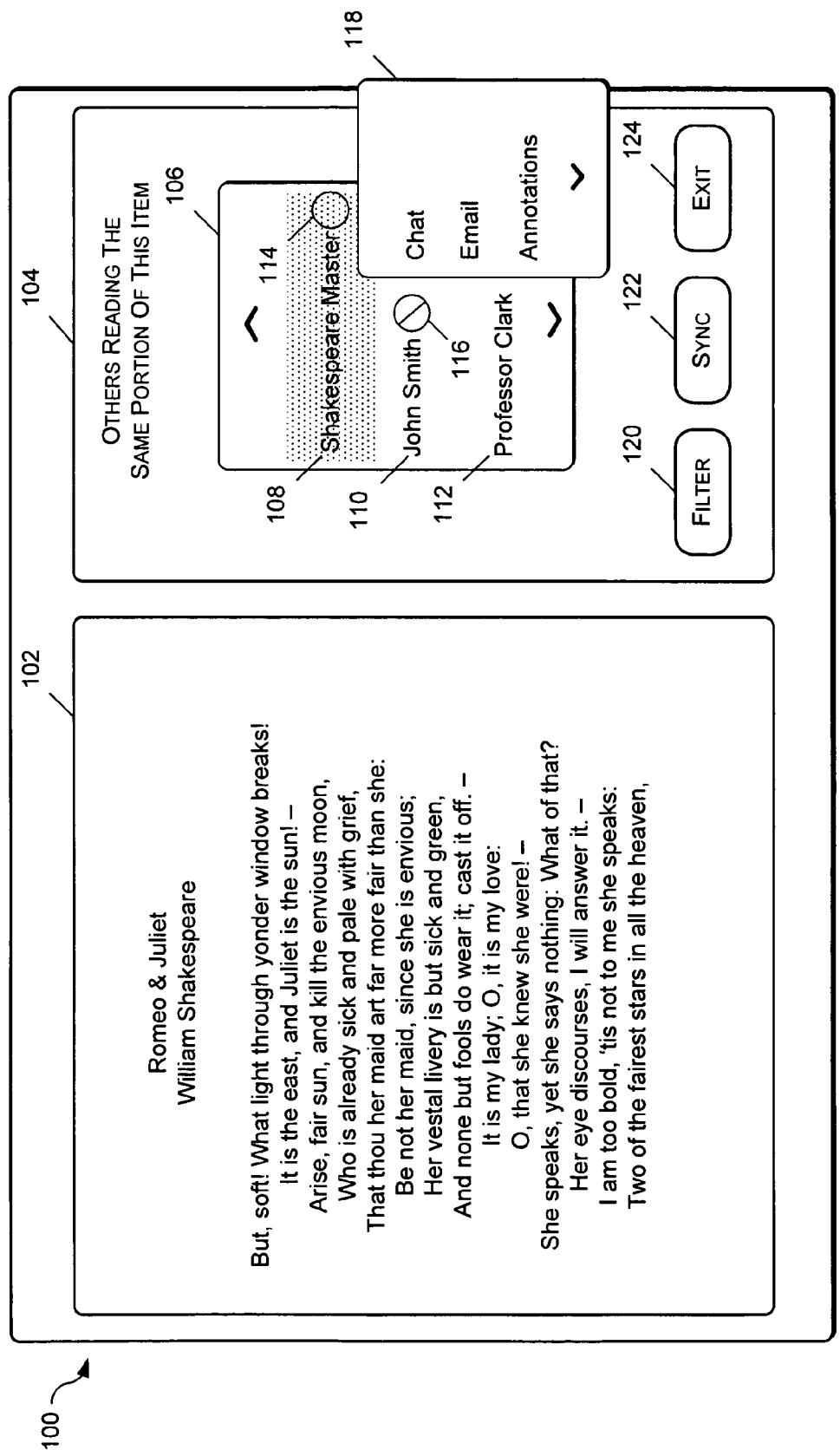
FIG. 1 is a pictorial diagram of an illustrative user interface configured to show identifiers of users of client devices, where the users are associated with a particular portion of a digital item.

This disclosure sets forth functionality for providing presence information within digital items. The functionality may be manifested in various systems, modules, computer readable media, data structures, methods, and other forms.
Overview This disclosure describes providing presence information within digital items. Presence information within a digital item indicates a portion of the digital item that is associated with a user of a client device. For example, presence information may specify a location within a digital item that a user of a client device is currently viewing, such as one or more lines of text or an offset from the beginning of the digital item. A digital item may include video content, such as a movie or television program. Additionally, a digital item may include audio content, for example a song or an album. A digital item may also include text-based content, such as a book or a magazine article. A portion of a digital item may include a track of a DVD storing a movie, a track of an audio CD storing a collection of songs, or a page or chapter of an eBook. A user of a client device, such as an electronic reader device, a wireless communication device, a personal digital assistant, a portable music player, or personal computer, may be associated with a particular portion of a digital item when the particular portion of the digital item is accessed via the client device. In one example, a user of a client device may be associated with a page of an eBook when the page is being viewed on a display of an electronic reader device. In another example, a user of a client device may be associated with a song of an album when the song is being output from speakers of a music player.

Users of client devices accessing digital items may want to exchange information and discuss digital items that are being accessed. In one illustration, client device users may want to discuss a particular chapter of an eBook with others that are reading the same chapter of the eBook. In another illustration, client device users may want to discuss a particular scene of a movie or a particular song that is being played via a respective client device.

By generating and storing presence information within digital items, a network service can identify client device users that are consuming (e.g., playing or viewing) the same portion of a particular digital item and give the users opportunities for live communications with each other via a network. Additionally, the network service can collect information of users of client devices and provide options to search for client device users having certain characteristics and interests. Providing opportunities for client device users to communicate with each other while accessing a digital item enhances the user experience. In addition, providing opportunities for client device users to communicate with others having similar interests or demographics also enhances the user experience. By providing these opportunities that enhance the user experience, the network service may increase the number of users downloading and purchasing digital items, increase the frequency of each user downloading and purchasing digital items, increase purchases of client devices that enable communication between users while accessing a digital item, and increase satisfaction with a client device that can be used to provide the opportunities to communicate.

Throughout this disclosure, techniques for providing presence information within digital items are described in the context of presence information regarding portions of electronic books (eBooks) using electronic reader devices. However, the techniques described herein are applicable to providing presence information regarding other digital items (textual, audio, and/or visual), made using other electronic devices.

Illustrative User Experience

FIGS. 1-6 illustrate pictorial diagrams of illustrative user interfaces 100-600 that are related to providing presence information within digital items. Each of the user interfaces 100-600 may be provided via a display of a client device, such as the client devices 704 and 706 of FIG. 7 and the electronic reader device 900 of FIG. 9. The user interfaces 100-600 may be generated based on instructions stored at the client device. In one embodiment, the instructions may be associated with proprietary software provided by the manufacturer of the client device or by an entity providing presence information of digital items. In another embodiment, the instructions may be associated with a publicly available viewer, such as the Adobe® Reader®, provided by Adobe Systems, Inc. of San Jose, Calif., Windows Media® Player, provided by Microsoft Corporation of Redmond, Wash., or iTunes®, provided by Apple, Inc of Cupertino, Calif. Additionally, each of the user interfaces 100-600 may be generated based on instructions stored at a server and delivered to the client device browser via a network, such as the Internet.

FIG. 1 is a pictorial diagram of an illustrative user interface 100 configured to show identifiers of users of client devices associated with a particular portion of a digital item. The user interface 100 includes a first display portion 102 and a second display portion 104. The first display portion 102 includes a portion of a digital item that is being read by a particular client device user. For example, the first display portion 102 of FIG. 1 shows text from William Shakespeare's *Romeo and Juliet*.

The second display portion 104 includes a window 106 that specifies client device users, or a particular subset, identified by a network service that are associated with the portion of the *Romeo and Juliet* shown in the first display portion 102. A client device user may be associated with the text of *Romeo and Juliet* shown in the first display portion 102 when the user is viewing at least some portion of the text shown in the first display portion 102 (or proximate to the text shown in the first display portion 102) on his or her client device. Additionally or alternatively, a client device user may be associated with the text included in the first display portion 102 when the user has placed an electronic book mark within at least a portion of the text shown in the first display portion 102 using their respective client device.

The window 106 includes a number of identifiers 108-112 that reference client device users who are associated with the portion of text shown in the first display portion 104 at the same time or about the same time (about the same time may include the same hour, day, week, etc.). In particular, the window 106 includes an identifier 108 for a first client device user with an alias "Shakespeare Master", a second identifier 110 for a second client device user with a name "John Smith", and a third identifier 112 that corresponds to a "Professor Clark." The identifier associated with a particular user may be specified by a client device user or by an administrator of a system, such as an administrator of a network service.

Although three identifiers are shown, there may be more or less than three. If there are more identifiers than can be displayed at once, window 106 permits a user to scroll through names, as indicated by the up/down scroll arrows at the top and bottom of the list. The identifiers viewable via the window 106 may be periodically and/or continuously updated as new users become associated with the text shown in the first display portion 102. Further, the identifiers viewable via the window 106 may change as a user changes the text shown in the first display portion 102, for example by turning the page. Alternatively, identifiers viewable via the window 106 may be updated or refreshed upon the occurrence of an event (e.g., user selection of a refresh option, user turning a page or otherwise advancing the content being viewed, turning on the reader device, restarting the device, or some other predetermined event).

The window 106 also includes availability indicators 114, 116 that specify whether or not a particular user is available to communicate via chat or email. The availability indicator 114 specifies that the user associated with the identifier 108 "Shakespeare Master" is available to communicate with other users. However, the availability indicator 116 specifies that the user associated with the identifier 110 "John Smith" is not available to communicate with other users.

The availability indicators 114, 116 may indicate the availability of a particular user to communicate with other users based on a color of the respective availability indicator 114, 116. For example, a red availability indicator may indicate that a user is not available to communicate with other users, while a green availability indicator may indicate that a user is available to communicate with other users. A user's availability may be limited based on user profile information. To illustrate, a user may indicate in a user profile a desire to only communicate with particular users, with users included in a specified group, or with users associated with specified characteristics, such as users of a particular age or profession.

The user interface 100 also includes a menu 118 that provides options relating to a particular client device user. In one example, the menu 118 may be shown upon selection of a particular identifier, such as the identifier 108. The menu 118 includes the options "chat", "email", and "annotations." Selection of the option "chat" may initiate a chat conversation with the user associated with the selected identifier. Selection of the option "email" may initiate composing an email to the user associated with the selected identifier. Further, the option "annotations" may be selected to view annotations provided by the user associated with the selected identifier. The menu 118 may also provide a "follow" option (not shown) that allows a user viewing the user interface 100 to follow the progress of a user associated with a selected identifier through a particular digital item. Additional options (not shown) that can be provided by the menu 118 include an option to initiate a video conference with the user associated with the selected identifier, an option to compose a text message or other type of text oriented message to send to the user associated with the selected identifier, an option to participate in an ongoing chat session, an option to view a chat history for a chat session that occurred at a previous time, an option to view times when subsequent chat sessions are scheduled to occur, a combination thereof, or options related to other available communication formats. The menu 118 may appear in response to a user input, such as a right click of a mouse after selecting an identifier, hovering a pointer over the identifier, double-clicking on the selected identifier, or by keyboard strokes.

Figure 2:
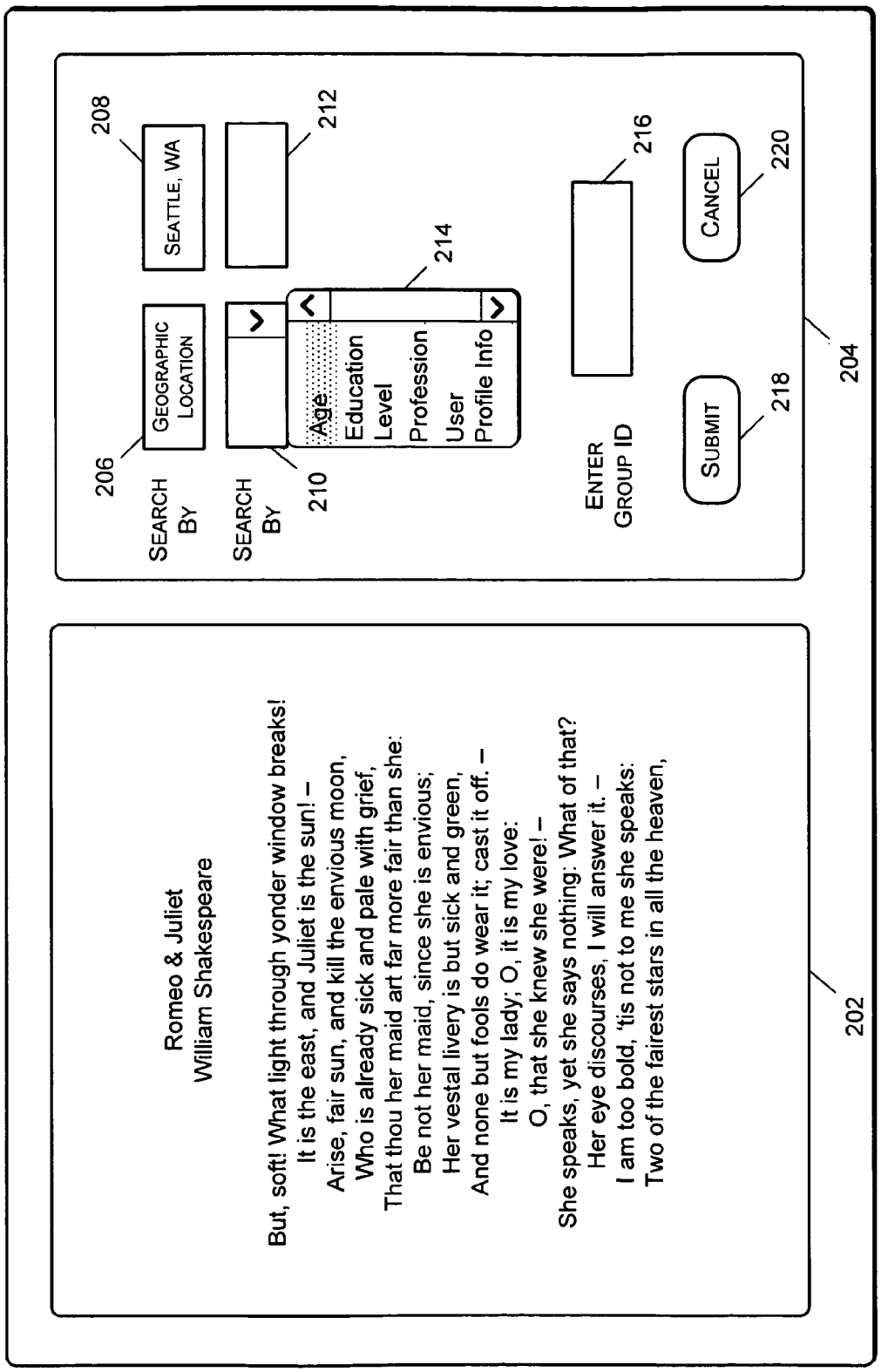
FIG. 2 is a pictorial diagram of an illustrative user interface configured to enter criteria to identify one or more users of client devices that are associated with the same portion of a digital item as a user viewing the user interface.

The user interface 100 also includes display options 120, 122, and 124. Selection of the display option 120 causes the display of a user interface to filter the identifiers shown in the window 106. For example, a user interface may be provided that facilitates entry of criteria to narrow the identifiers shown in the window 106. An example of a user interface to enter criteria to filter identifiers associated with a particular portion of a digital item is shown in FIG. 2. The user interface 100 may also include a display option 122 to synchronize the portion of the digital item shown in the first display portion 102 with a different portion of the digital item viewed by a user of another client device. For example, selection of the display option 122 may result in a user interface that provides options to select a particular user associated with a portion of the digital item that is different from the portion of the digital item shown in the first display portion 102. After a synchronization process has been initiated, the first display portion 102 is updated to include the portion of the digital item associated with the selected user and the second display portion 104 is updated to include identifiers of other users associated with the different portion of the digital item. The display option 124 is configured to exit the user interface 100. Exiting the user interface 100 may involve closing or minimizing the second display portion 104 and enlarging the first display portion 102 to cover a larger area of the user interface 100. Alternatively, selection of the display option 124 may result in other content being displayed in the second display portion 104, such as a default menu or a default user interface.

FIG. 2 is a pictorial diagram of an illustrative user interface 200 configured to enter criteria to identify one or more other client device users that are associated with the same portion of an eBook as a user viewing the user interface 200. The user interface 200 may be provided in response to selection of the filter display option 120 of FIG. 1. In one example, a user viewing the user interface 200 may enter criteria to filter client device users associated with a particular portion of the eBook. In another example, a user viewing the user interface 200 may enter criteria of a request to identify particular users of client devices associated with a particular portion of the eBook.

The user interface 200 includes a first display portion 202 comprising content related to a digital item. In this example, the first display portion 202 includes text from a portion of William Shakespeare's *Romeo and Juliet*. The user interface 200 also includes a second display portion 204 that includes a number of fields 206-212 and 216. The fields 206-212 and 216 are configured to receive criteria entered by a user of a client device. The criteria are utilized to identify other users of client devices that are associated with a particular portion of a digital item, such as some or all of the text of *Romeo and Juliet* shown in the first display portion 202. The user may input criteria freeform or, as shown in FIG. 2, by selecting from among predetermined options. The criteria may be entered into the fields 206-212 and 216 via strokes of a keyboard, operation of a pointing device, such as a mouse, operation of a stylus, combinations thereof, or other suitable user input means. In one example, the field 206 indicates an input to identify others reading the same portion of *Romeo and Juliet* based on geographic location. The field 208 indicates a selection of the geographic location "Seattle, Wash." Thus, a search or filtering operation may be conducted to at least find others reading the portion of *Romeo and Juliet* shown in the first display portion 202 who are located in Seattle, Wash.

Further criteria may be entered into the fields 210, 212. For example, a user may select the field 210 and a drop-down menu 214 may appear with a number of additional criteria. The drop-down menu 214 includes the criteria: age, education level, profession, and user profile information. Upon making a selection from the drop-down menu 214, the user may enter a specific value for the selected option, such as an age range or a type of profession. An additional drop-down menu (not shown) may also be used to enter criteria in the field 212. For example, a drop-down menu for the field 212 may include age ranges, types of professions, and educational levels. The selection of the user profile information option of drop down menu 214 relates to matching user profile information of a user viewing the user interface 200 with user profile information of other client device users. For example, selecting the user profile information option may generate a request to identify other client device users having the same demographic data, hobbies, interests, etc.

The second display portion 204 also includes a field 216 to enter a group identification number that may be used alternatively, or in addition, to the criteria entered in the other fields 206-212. For example, a user of a client device may be a member of an international book club and want to identify other members of the same book club in a particular part of the world that are reading the same portion of *Romeo and Juliet*. In order to generate such a request, the user can enter a group identifier or other search criteria associated with the international book club. Additionally, the field 216 may be associated with a pre-populated drop-down menu that includes identifiers of groups that include the user viewing the user interface 200.

Further, the second display portion 204 includes display options 218, 220. Upon selection of the display option 218, a request may be generated to identify other users associated with a specified portion of an eBook based on the criteria entered in the fields 206-212, 216. The selection of the display option 218 may also prompt the client device providing the user interface 200 to send the request to a server system, such as the server system 702 described below. Selection of the display option 220 may cancel a particular search or filter request and/or clear one or more of the fields 206-212, 216.

Figure 3:
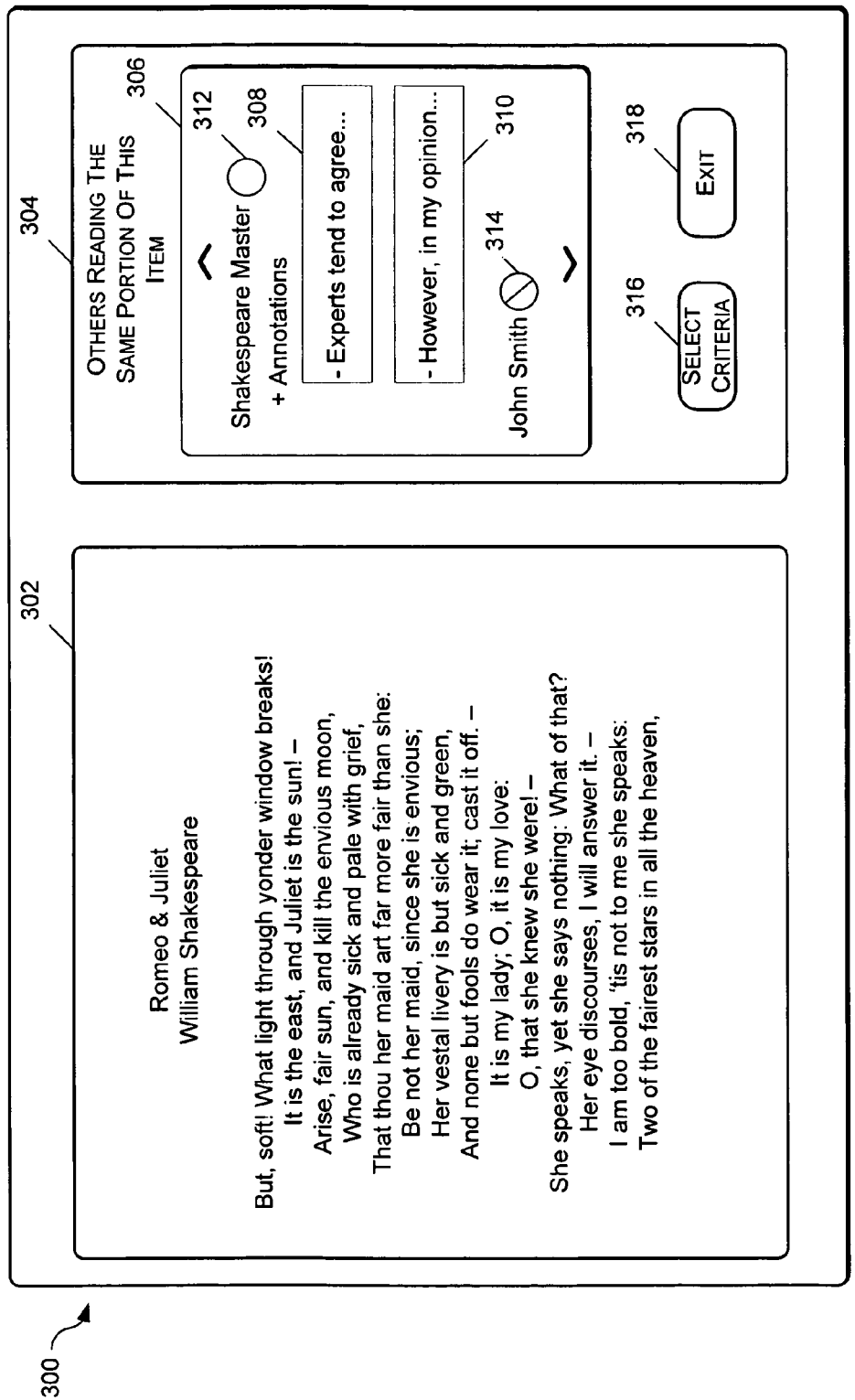
FIG. 3 is a pictorial diagram of an illustrative user interface configured to display annotations submitted by one or more users associated with a particular portion of a digital item.

FIG. 3 is a pictorial diagram of an illustrative user interface 300 configured to display annotations submitted by one or more users associated with a particular portion of a digital item. The user interface 300 may be generated upon selection of the "annotations" option of the menu 118 of FIG. 1. The user interface 300 includes a first display portion 302 and a second display portion 304. The first display portion 302 includes content related to a digital item. In particular, the first display portion 302 includes text from a portion of Shakespeare's *Romeo and Juliet*. The second display portion 304 includes a window 306 indicating identifiers of other users associated with the text shown in the first display portion 302. For example, the window 306 shows that the users "Shakespeare Master" and "John Smith" are associated with the text shown in the first display portion 302.

The window 306 also includes a first annotation window 308 and a second annotation window 310 showing a portion of annotations that have been submitted by the user "Shakespeare Master." The first annotation window 308 and the second annotation window 310 may be selectable via a user input device to show a greater portion of the respective annotation. For example, selection of the first annotation window 308 may result in the display of a separate window or screen (not shown) that shows a greater portion of the selected annotation. Other information may also be included with the annotation, such as the time that the annotation was entered, the geographic location of the annotation commentator, contact information associated with the annotation commentator, other information relating to the annotation commentator, or any combination thereof.

The window 306 also includes availability indicators 312, 314 that specify the availability of a particular user to communicate with other users. The window 306 may include an availability indicator of a user viewing the user interface 300. The availability indicator 312 specifies that the user associated with the identifier "Shakespeare Master" is available to communicate with other users. The indicator 314, though, specifies that the user "John Smith" is not available to communicate with other users.

Further, the user interface 300 includes display options 316, 318. The display option 316 is selectable to generate a user interface, such as the user interface 200 shown in FIG. 2, that is configured to enter criteria for a user request to identify a different or narrower set of users that is associated with the same portion of a digital item as shown in the first display portion 302. The display option 318 is selectable to exit the user interface 300.

Figure 4:
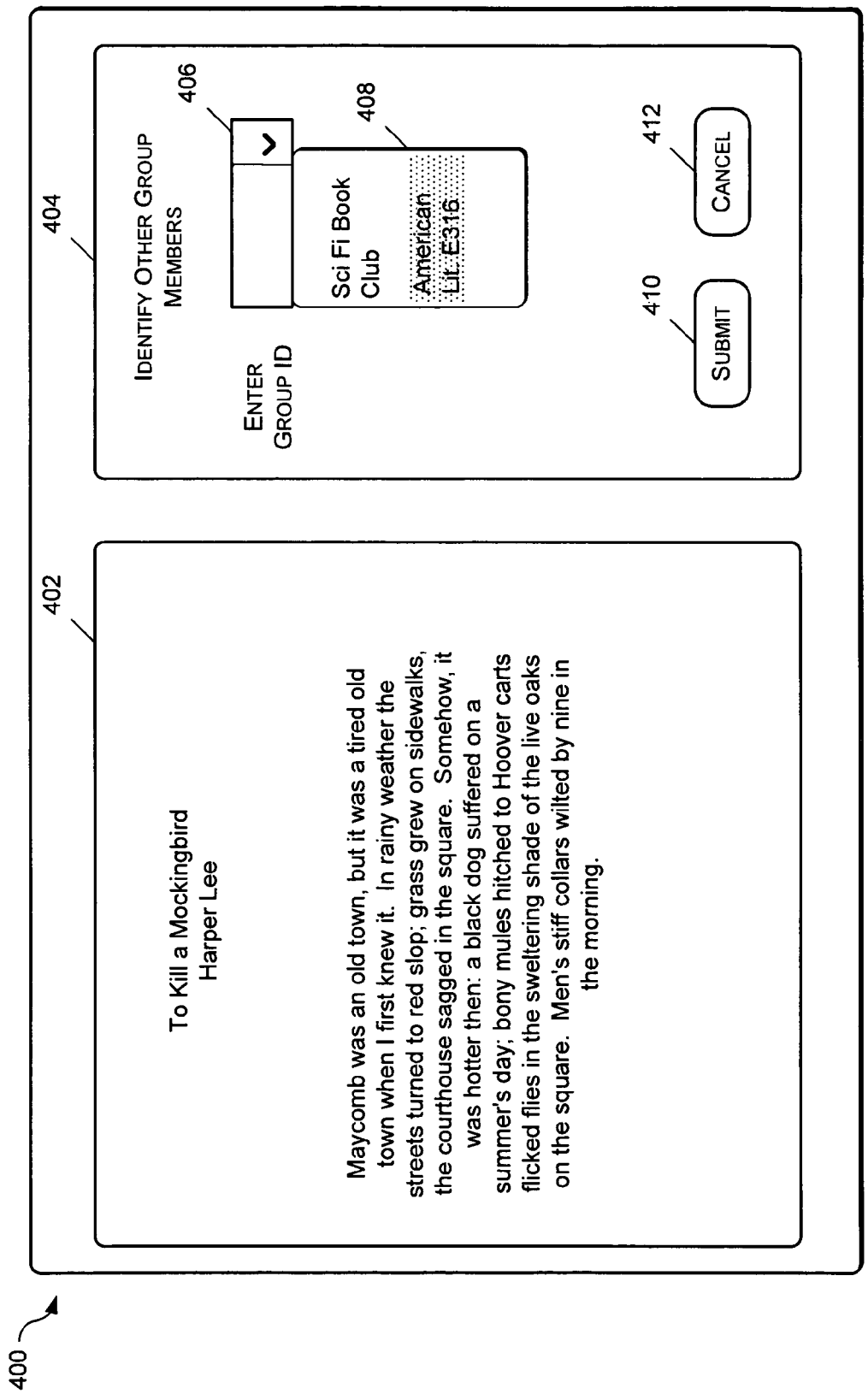
FIG. 4 is a pictorial diagram of an illustrative user interface to enter a request to identify users of client devices associated with a particular group that includes a user viewing the user interface.

FIG. 4 is a pictorial diagram of an illustrative user interface 400 to enter a request to identify users of client devices associated with a particular group that includes a user viewing the user interface 400. The user interface 400 includes a first display portion 402 and a second display portion 404. The first display portion 402 includes a portion of a digital item. In particular, the first display portion 402 comprises text of a portion of Harper Lee's *To Kill a Mockingbird*. The second display portion 404 includes a field 406 to enter a group identifier. The group identifier may be entered via a drop down menu, such as the drop down menu 408. The drop down menu 408 may be pre-populated with identifiers of groups that include the user viewing the user interface 400 as a member. The identifiers may be assigned by a user viewing the user interface 400, an administrator of a system providing presence information within digital items, or a combination thereof. In an alternative embodiment, the second display portion 404 may include a separate field and corresponding drop down menu including individual user identifiers that may be of interest to the user viewing the user interface 400, such as identifiers of contacts, identifiers of friends, identifiers of followers, identifiers of people the user follows, or identifiers of people within a specified distance in a social network graph.

The drop down menu 408 shown in FIG. 4 indicates membership in a book club identified "SciFi Book Club" and an educational group identified as "American Lit. E316." The user interface 400 indicates selection of the educational group "American Lit. E316" via a user input device by showing "American Lit. E316" as being highlighted.

The user interface 400 also includes display options 410, 412. The display option 410 is selectable to submit a request to identify other members of a group selected from the drop down menu 408 or otherwise entered into the field 406. The display option 412 is selectable to cancel a request to identify other members of a group.

Figure 5:
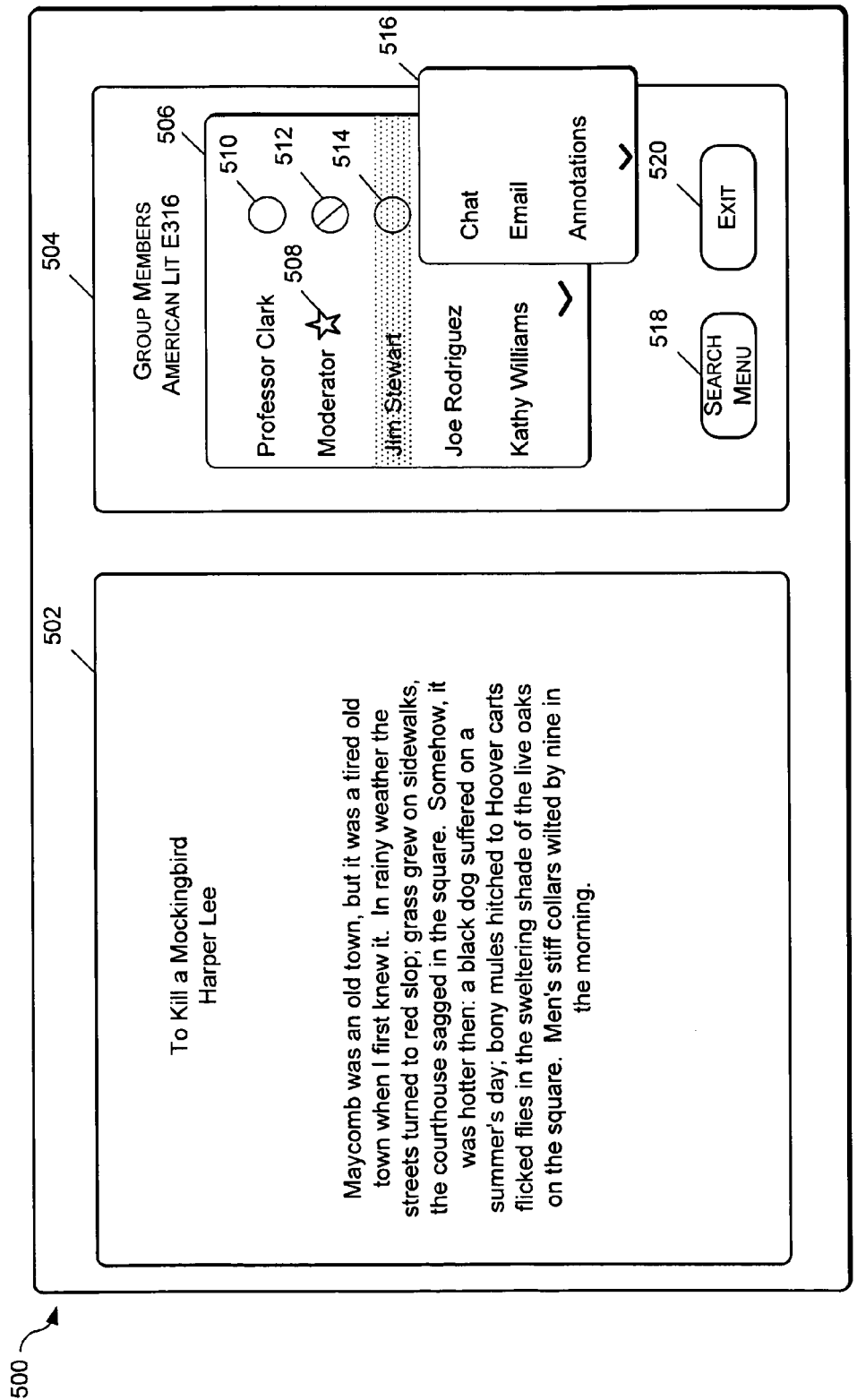
FIG. 5 is a pictorial diagram of an illustrative user interface configured to show members of a group including a user viewing the user interface.

FIG. 5 is a pictorial diagram of an illustrative user interface 500 configured to show members of a group including a user viewing the user interface 500. The user interface 500 may be generated after selection of the submit display option 410 of FIG. 4. In particular, the user interface 500 shows members of an educational group, American Lit. E316, that are reading Harper Lee's *To Kill a Mockingbird*.

The user interface 500 includes a first display portion 502 and a second display portion 504. The first display portion 502 includes a portion of a digital item associated with a user of a client device. In particular, the first display portion 502 includes text from Harper Lee's *To Kill a Mockingbird*. The second display portion 504 shows information of a number of members of a particular group that includes a user viewing the user interface 500. The second display portion 504 includes a window 506 that has identifiers associated with each group member and may include a respective indicator (not shown) specifying a portion of a digital item associated with each respective group member. For example, the indicators may specify a location within a book associated with a particular group member, such as a page number, character count, offset from the beginning of the book, offset from the beginning of a particular chapter, or a combination thereof. The indicators may be provided based on presence information associated with the particular book group members. The format of the indicators may be user specified or specified by the client device.

In some embodiments, a moderator may be available to communicate with members of one or more groups that are reading a particular work via chat sessions, email, or other forms of electronic communication. The moderator may include the author of the particular work, an editor of the particular work, a celebrity hosting a book club reading the particular work, another authority figure associated with the particular work, or a combination thereof. In addition, the moderator may monitor communications of groups that are reading works by the author. For example, the moderator may have access to annotations submitted by members of a group regarding a particular work. In another example, the moderator may provide annotations and/or feedback to annotations or chat sessions associated with members of one or more groups. The moderator may be identified in the window 506 via a particular indicator, such as the indicator 508.

The window 506 also includes availability indicators 510-514 to specify whether or not a particular group member is available to communicate with other client device users. For example, the availability indicators 510 and 514 specify that the group members "Professor Clark" and "Jim Stewart" are available to communicate with other client device users. Further, the availability indicator 512 specifies that the moderator is not currently available to communicate with other client device users.

Upon selection of a particular group member, a drop down menu, such as the drop down menu 516, may be presented. To illustrate, FIG. 5 indicates that the group member "Jim Stewart" has been selected by a user viewing the user interface 500 as shown by the highlighting of "Jim Stewart" in FIG. 5. The drop down menu 516 indicates that a user viewing the user interface 500 may communicate with the group member "Jim Stewart" via chat or email. The drop down menu 516 also indicates that the user viewing the user interface 500 may access any annotations associated with the group member "Jim Stewart" for the particular portion of the digital item shown in the first display portion 502.

The second display portion 504 also includes display options 518, 520. Selection of the display option 518 returns a user to a search menu to enter a request to identify members of a particular group, such as the user interface 400 shown in FIG. 4. The display option 520 is configured to exit the user interface 500.

Figure 6:
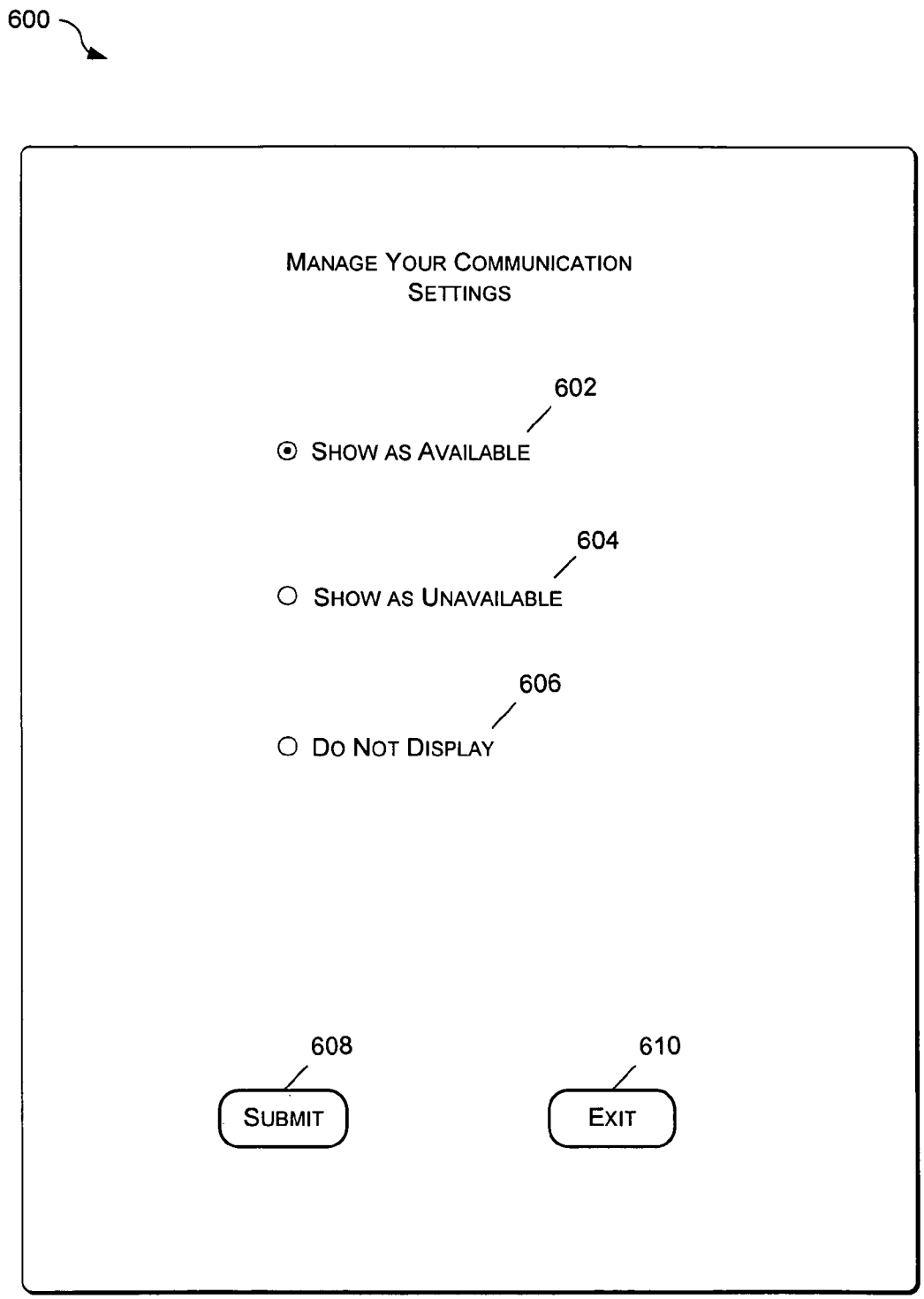
FIG. 6 is a pictorial diagram of a user interface configured to manage communication settings for a user's client device.

FIG. 6 is a pictorial diagram of a user interface 600 configured to manage communication settings of a user's client device. In particular, the user interface 600 includes selectable options 602-606 specifying the availability of a user viewing the user interface 600 to communicate with other client device users. The user viewing the user interface 600 may individually select an option 602-606 with respect to particular client device users, or the user viewing the user interface 600 may select an option 602-606 to apply to all or a subset of client device users associated with the user viewing the user interface 600. Selection of the option 602 specifies that the user viewing the user interface 600 is available to communicate with one or more other client device users. Additionally, selection of the option 604 specifies that the user viewing the client device 600 is not available to communicate with one or more other client device users. In some embodiments, an availability indicator, such as the availability indicators 114, 116 of FIG. 1, 312, 314 of FIG. 3, and 510-514 of FIG. 5, associated with the user viewing the user interface 600 indicates that the user is or is not available to communicate with other client device users depending on selection of the option 602 or the option 604. Selection of the option 606 specifies that an identifier, such as the identifiers of FIGS. 1, 3, and 5, associated with the user viewing the user interface 600 is not to be shown to one or more other client device users. In this way, a user viewing the user interface 600 can manage his or her visibility with respect to other client device users. Further, the user interface 600 includes a display option 608 to submit a request to implement the selected option 602-606 and the user interface 600 includes a display option 610 to exit the user interface 600.

Illustrative Computing Environment

Figure 7:
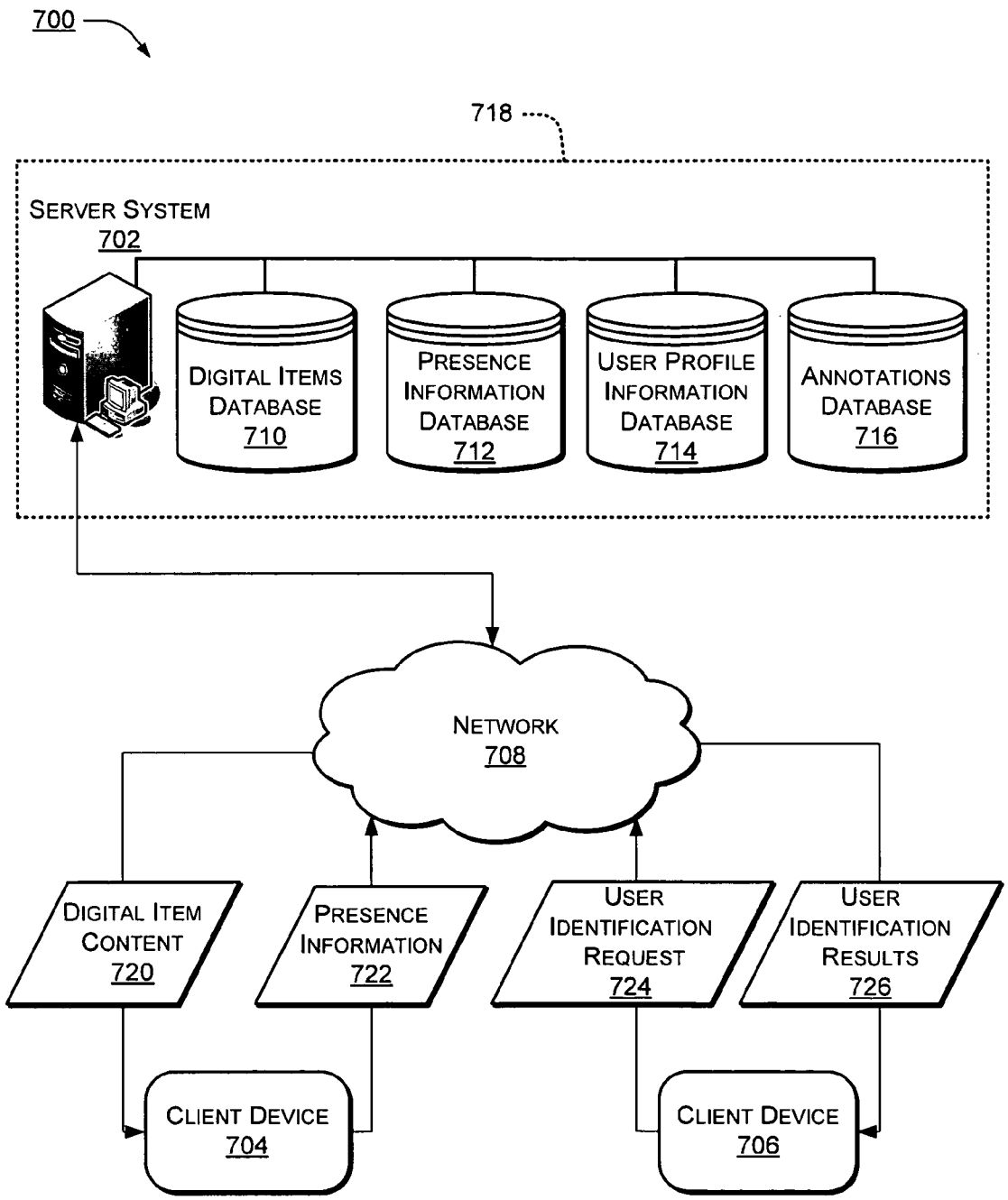
FIG. 7 is a pictorial diagram of an illustrative computing environment that includes a server system and a number of client systems communicatively connected via a network.

FIG. 7 is a pictorial diagram of an illustrative computing environment 700 that includes a server system 702 and a number of client devices 704, 706 communicatively connected via a network 708. Although two client devices are shown in FIG. 7, the computing environment 700 may include any number of client devices. The network 708 may include a local area network, a wide area network, such as a public switched telephone network (PSTN), a cable television network, a satellite network, a collection of networks, a public Internet Protocol (IP) network, a private IP network, or a combination thereof. Moreover, the network 708 may be wired, wireless, or a combination of the two. The computing environment 700 also includes a digital items database 710, a presence information database 712, a user profile information database 714, and an annotations database 716. The digital items database 710, the presence information database 712, the user profile information database 714, and the annotations database 716 may be integrated with the server system 702 or otherwise communicatively coupled with the server system 702. In an illustrative embodiment, the digital items database 710, the presence information database 712, the user profile information database, 714, and the annotations database 716 may include one or more CD-RW/DVD-RW drives, hard disk drives, tape drives, or other storage devices that are utilized to store digital content and information. The server system 702, separately or together with the digital items database 710, the presence information database 712, the user profile information database 714, and the annotations database 716, may provide a network service 718 that utilizes presence information of client device users to enhance the user experience.

The first client device 704 and the second client device 706 may each include a personal computer, an electronic reader device, a laptop computer, a personal digital assistant (PDA), a portable gaming device, a wireless communication device, such as a smart phone or mobile handset, a set-top-box, a game console, a portable music player, etc., or any combination thereof. In addition, to communicating with each other via the network 708, the first client device 704 and the second client device 706 may communicate via peer-to-peer wired or wireless connections. As will be described with regard to the particular implementations shown herein, the server system 702 is configured to exchange data and information, including digital items and presence information, among the client devices 704, 706. In some circumstances, the server system 702 may be associated with a merchant, such as an electronic retailer authorized to provide a marketplace for selling and distributing digital items to consumers. However, in other examples, the server system 702 may be associated with a network resource (e.g., website) facilitating sale or distribution of items by other sellers, a social networking network resource, an academic or educational network resource, or any other network resource.

The digital items database 710 stores electronic media files comprising a plurality of digital items that may be accessible to the client devices 704, 706 via the network 708. For example, the network service 718 may sell and distribute digital items to consumers via the client devices 704, 706. A "digital item" as used herein may include any type of content that can be stored and distributed in digital form. For example, digital items may include without limitation, text content, text formatting, image content, audio content, video content, hypertext protocol content, multimedia content and so on, or any combination of these kinds of content. Some specific examples of digital items include, without limitation, all forms of textual information, such as books, magazines, newspapers, newsletters, periodicals, journals, reference materials, telephone books, textbooks, anthologies, proceedings of meetings, forms, directories, maps, manuals, guides, references, articles, reports, documents, etc., and all forms of audio and audiovisual works such as music, multimedia presentations, audio books, movies, still images, pictures, photographs, or any combination thereof. Additionally, "digital item" may refer to a portion of a larger work, such as a chapter of a book, or a song of an album, etc. Further, a digital item may refer to a larger compilation of component items which are related in any manner. For instance, an item may refer to multiple issues of a magazine in a particular year.

The presence information database 712 stores presence information associated with users of a number of client devices. Presence information indicates a portion of a digital item associated with a user of a particular client device. A portion of a digital item may be associated with a user of a client device based on a portion of a digital item provided via an output device of a client device. For example, a portion of a digital item associated with a user of a client device may include a page or certain text of an eBook that is being viewed by the user. In this example, the presence information associated with the user may specify certain lines of text of the eBook that are being viewed by the user via the client device, such as lines 1100-1150 of *War and Peace* by Leo Tolstoy. In another example, a portion of a digital item may be associated with a user of a client device when the user or the client device marks a particular page or portion of text of an eBook that was being viewed by the user before the client device was turned off or entered an extended period with no activity, such as a sleep mode, hibernation mode, or screen saver mode. In this example, the presence information associated with the user may specify certain lines of text marked by the user. In one embodiment, presence information may be received from client devices, such as the client devices 704, 706. In another embodiment, presence information may be generated at the server system 702 based on a portion of a digital item sent from the server system 702 to a particular client device.

The user profile information database 714 stores data relating to profiles of users of client devices, such as users of client devices 704, 706. The user profiles may include personal information associated with each particular user, such as age, occupation, location of residence, group memberships, and interests. The user profiles may also include identifiers for other users of client devices that are included in a friends and family group, a social graph, etc. For example, a friends and family group may include members of groups that a particular user is associated with, such as an educational class, a social networking group, a book club, or a combination thereof. User profile information may also specify that a particular user has designated to communicate freely with members of a respective friends and family group, but that communication with others is restricted or otherwise limited to those obtaining permission from the particular user. The user profile information may be used by the server system 702 to identify users of client devices matching criteria specified in a user identification request. The user profile information may also be used by the server system 702 to identify members of a particular group.

The annotations database 716 stores data related to annotations of digital items stored in the digital items database 710. For example, annotation data may include an annotation, metadata associated with the annotation, such as the time that the annotation was entered and/or the client device that sent the annotation to the server system 702, information associated with the commentator of the annotation, such as personal information of the commentator, or a combination thereof. Annotations may be received in a visual form, in an audio form, or a combination thereof. For example, annotations may be expressed via handwriting, text, formatting (such as highlighting), an attachment of image files, an attachment of audio files, or a combination thereof. Annotations may be words, graphs, formulae, files, images, enhancements, etc., provided by a commentator. For digital items that include audio content, such as music files, commentators can annotate the music files with additional content commenting on the songs, providing background information on the singer or the recording process, alternative lyrics, technical information as to the composition, related musical compositions, etc. In another circumstance, a student or teacher as a commentator may provide a markup of an academic textbook. By way of illustration, an annotation can also be in the form of a link or address to another page, file, or document available to the server system 702 or the client devices 704, 706. There is virtually no limitation to the type, form and content of annotations that can be added to a digital item.

In one embodiment, the server system 702 may receive annotations to store in the annotations database 716 via client devices, such as the client devices 704, 706. In addition to, or instead of, storing annotations at the annotations database 716, annotations may be stored locally at the client devices 704, 706. In some instances, annotations may be stored in local memory of the client devices 704, 706, and subsequently transmitted to a remote data store, such as the annotations database 716. Annotations may be stored in an annotation file separate from a corresponding digital item, embedded in a data file of the digital item, or otherwise associated with the digital item. Storing an annotation in association with a digital item may be accomplished in any suitable manner, including simply storing the annotation in the annotations database 716 with an indication of the digital item to which the annotation pertains.

Furthermore, visual indicators may be included in a digital item to identify particular content having annotations. In a textual digital item for example, the indicators may appear as footnotes, graphical icons, symbols, characters, or other indicia that are located with the text. Where the digital item is an audio work or an audiovisual work, an annotation associated with particular content in the digital item may be identified by an indicator in a playback control provided for playback of the digital item. In yet another alternative, a digital item having annotations pertaining to particular content in the digital item may provide a listing of contents for the digital item with indicators in the listing of contents identifying the location of the annotations.

In an illustrative embodiment, digital items stored in the digital items database 710 may be accessed by the client devices 704, 706 via the server system 702. For example, a client device, such as the client device 704, sends a request to access a particular digital item to the server system 702. The request may relate to accessing all of the content of the digital item or a specified portion of the content of the digital item. In one example, in response to receiving a request to access a digital item, the server system 702 sends digital item content 720 to the client device 704. The digital item content 720 can be viewed on a display of the client device 704. To illustrate, the server system 702 may send data related to a web page including the text of a portion of an eBook to the client device 704. As a user of the client device 704 navigates through a digital item, the client device 704 may send additional requests to view other portions of the digital item, such as for other pages of the eBook. In turn, the server system 702 may send content of the digital item relating to the additional requests for each portion of the digital item, such that the content of the digital item provided to the user via the client device 704 is continuously updated. In another example, the server system 702 may send all of the data related to the content of the digital item to the client device 704 to be downloaded and stored in memory of the client device 704. Additionally, digital item content 720 may be stored at the client device 704 and accessed at a later time. Further, the digital item content 720 may be streamed from the server system 702 to the client device 704.

After receiving the digital item content 720, the client device 704 may determine presence information 722 relating to the digital item content 720. Presence information 722 may include an indicator specifying the digital item content 720, an identifier of a user accessing the digital item content 720 via the client device 704, an identifier of the client device 704, an indicator specifying a portion of a digital item accessed via the client device 704, or a combination thereof. In one embodiment, the presence information 722 specifies at least a portion of the digital item content 720 that is currently being provided to an output device of the client device 704. For example, the presence information 722 may specify that a particular page or section of text of an eBook that is being provided to a display of the client device 704. Additionally, the presence information 722 may specify a particular track of video content that is provided to the display of the client device 704 or a particular track or song of audio content that is provided to speakers of the client device 704. Each time that a user of the client device 704 turns a page of an eBook, views a different section of text of an eBook, listens to another song of audio content, or views another portion of video content, the client device 704 updates presence information associated with the client device 704.

Further, the client device 704 may continuously update the presence information 722 associated with a digital item that is being streamed to the client device 704 by tracking the amount of time that the digital item content 720 has been streaming to the client device 704. In one example, the client device 704 may track an amount of time that a particular song has been streaming to the client device 704 or an amount of time that video content has been streaming to the client device 704. The presence information 722 may be updated regularly, such as every second or every 0.25 seconds.

In addition, the presence information 722 may be generated based on a marker of a position within a digital item that is generated each time that the client device 704 receives a different portion of a digital item from the server system 702 or when the client device 704 is no longer providing a portion of the digital item to an output device of the client device 704. For example, each time that the client device 704 shuts off, the client device 704 may generate a marker indicating a portion of a digital item, such as a page number or track, that was last accessed by the client device 704.

After generating the presence information 722 for the digital item content 720, the client device 704 may store the presence information 722 locally. Alternatively, or additionally, the client device 704 may send the presence information 722 to the server system 702 for storage. In a particular embodiment, the client device 704 may generate and store presence information related to a number of different users of the client device 704. For example, the client device 704 may be utilized by a number of members of a particular family and each member of the family may access a particular digital item at different times. To illustrate, members of a family may take turns reading the same eBook using the client device 704 and each family member may have a different stopping point. In this illustration, the client device 704 may store presence information relating to the stopping point in the eBook for each family member. Additionally, the client device 704 may generate presence information relating to a number of digital items accessed via the client device 704. For example, a number of different eBooks may be accessed by one or more users of the client device 704 and the client device 704 may generate and store presence information for each of the eBooks accessed via the client device 704.

Further, the server system 702 may determine presence information relating to digital items accessed via the client device 704. For example, the server system 702 may determine presence information for digital items being streamed from the server system 702 to the client device 704 by periodically updating the presence information based on an amount of time that the digital item has been streaming to the client device 704 relative to the total amount of time associated with the digital item. To illustrate, the server system 702 may generate presence information indicating that the server system 702 has streamed 1:35:02 of video content that has a running time of 2:00:00 or that the server system 702 has streamed 2:32 of an audio track that has a duration of 4:18.

In addition, the server system 702 may determine presence information for a user of the client device 704 based on a portion of a digital item sent to the client device 704. For example, the server system 702 may send content to the client device 704 relating to a particular page of an eBook. The server system 702 may then generate presence information indicating that the particular page has been sent to the client device 704.

In another illustrative embodiment, the client device 706 sends a user identification request 724 to the server system 702. The user identification request 724 may specify a request to identify users of client devices that are associated with a particular portion of a digital item. In some embodiments, the user identification request 724 may relate to identifying all client device users associated with the particular portion of the digital item. In other embodiments, the user identification request 724 may relate to identifying a subset of client device users associated with the particular portion of the digital item. For example, the user identification request 724 may include a user identification filter request or a user identification search request including criteria to identify particular client device users associated with the particular portion of the digital item. Criteria specified in the user identification request 724 may include demographic information, geographic information, personal information, such as profession or interests, membership in a certain group, or a combination thereof. For example, the user identification request 724 may relate to identifying a group of users located in Houston, Tex., that are doctors who are currently reading the same page or chapter of an eBook that a user of the client device 706 is reading.

In response to receiving the user identification request 724 from the client device 706, the server system 702 searches the presence information database 712 and/or the user profile information database 714 to identify users associated with the particular portion of the digital item specified in the user identification request 724. In some instances, the server system 702 identifies each of the client device users associated with the particular portion of the digital item specified in the user identification request 724. In other instances, the server system 702 identifiers client device users that match criteria included in the user identification search request 724. After identifying users of client devices that satisfy the user identification request 724, the server system 702 generates user identification results 726 and sends the user identification results 726 to the client device 706. The user identification results 726 may include identifiers of all of the users associated with the portion of the digital item specified in the user identification request 724 or identifiers of the users matching criteria included in the user identification request 724, such as user names or aliases assigned by the network service 718, selected by the respective user, or a combination thereof. In some embodiments, the user identification results 726 indicate members of a group that includes the user of the client device 706 and also indicate the location within a digital item, such as an offset or word count of an eBook, associated with each member of the group.

The user identification results 726 may also include identifiers of client devices associated with the users specified in the user identification results 726, such as an IP address or a telephone number. In this way, the client device 706 may directly establish communications with another client device. In another embodiment, the client device 706 may establish communications with another client device via the server system 702. For example, a user of the client device 706 may send a request to the server system 702 to establish communications, such as a chat session, with a user of another client device included in the user identification search results 726. In response to a receiving a request to establish communications with a particular user, the server system 702 may identify one or more client devices associated with the user. In one embodiment, the server system 702 may identify a particular client device that has been designated as a primary contact client device and attempt to establish communications with the primary contact client device. In another embodiment, the server system 702 may try to establish contact with each client device associated with the particular user. Further, client device identifiers included in the user identification search results 726 can facilitate sending an email message or text message from the client device 706 to another client device via the server system 702.

Illustrative Server System

Figure 8:
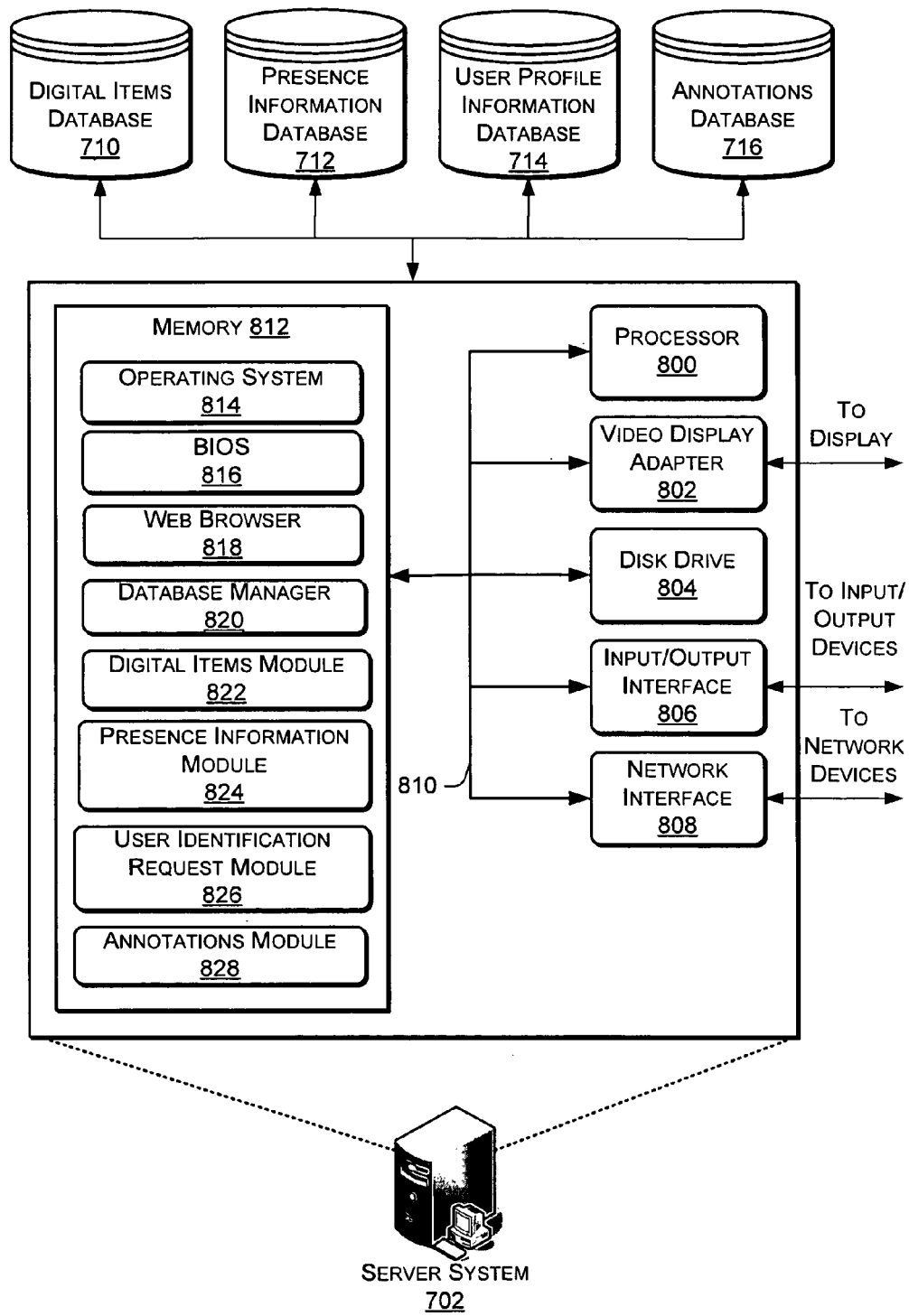
FIG. 8 is a schematic block diagram of an illustrative implementation of a server system that may be used in the computing environment of FIG. 7.

FIG. 8 is a schematic block diagram of an illustrative implementation of a server system, such as the server system 702, that may be used to provide presence information of digital items. The server system 702 includes a processor 800, such as one or more redundant processors, a video display adapter 802, a disk drive 804, an input/output interface 806, a network interface 808, and a memory 812. The processor 800, the video display adapter 802, the disk drive 804, the input/output interface 806, the network interface 808, and the memory 812 may be communicatively coupled to each other by a communication bus 810.

The video display adapter 802 provides display signals to a local display (not shown in FIG. 8) permitting an operator of the server system 702 to monitor and configure operation of the server system 702. The input/output interface 806 likewise communicates with external input/output devices not shown in FIG. 8, such as a mouse, keyboard, scanner, or other input and output devices that can be operated by an operator of the server system 702. The network interface 808 includes hardware, software, or any combination thereof, to communicate with other computing devices. For example, the network interface 808 may be configured to provide communications between the server system 702 and other computing devices, such as the first client device 704 and the second client device 706, via the network 708, as shown in FIG. 7.

The memory 812 generally comprises random access memory (RAM), read-only memory (ROM), flash memory, and/or other volatile or permanent memory. The memory 812 is shown storing an operating system 814 for controlling the operation of the server system 702. A binary input/output system (BIOS) 816 for controlling the low-level operation of the server system 702 is also stored in the memory 812.

The memory 812 additionally stores program code and data for providing network services that allow client devices to exchange information and data files with the server system 702. Accordingly, the memory 812 may store a browser application 818. The browser application 818 comprises computer executable instructions, that, when executed by the processor 800 generate or otherwise obtain configurable markup documents such as web pages. The browser application 818 communicates with a database manager application 820 to facilitate data exchange between the digital items database 710, the presence information database 712, the user profile information database 714, the annotations database 716, or any combination thereof, and client devices, such as the first client device 704 and the second client device 706 shown in FIG. 7.

Additionally, the memory 812 includes a digital items module 822, a presence information module 824, a user identification request module 826, and an annotations module 828. The modules 822-828 may be executable by the processor 800 to implement one or more of the functions of the server system 702. In one embodiment, each of the modules 822-828 may represent instructions embodied in one or more software programs stored in the memory 812. In another embodiment, the modules 822-828 can represent hardware, software instructions, or a combination thereof.

In a particular embodiment, the digital items module 822 is configured to provide digital items from the digital items database 710 to one or more client devices via a network, such as the first client device 704, the second client device 706, and the network 708 of FIG. 7. For example, the digital items module 822 may receive a request from a client device to access a particular digital item and the digital items module 822 is configured to retrieve at least a portion of the digital item to send to the requesting client device. To illustrate, the digital items module 822 may retrieve data including a page of a particular eBook from the digital items database 710 in response to a request from a client device and send the data to the client device. In another illustration, the digital items module 822 may retrieve data relating to a song from an album and send the data to a requesting client device.

The digital items module 822 may also be configured to stream digital items from the digital items database 710. For example, the digital items module 822 may continuously retrieve video content relating to a movie or television program and forward the video content to a client device in response to receiving a request for the video content from the client device.

The presence information module 824 may be configured to determine presence information associated with a user of a client device and store the presence information in the presence information database 712. In one embodiment, the presence information module 824 may determine presence information of a user of a client device based on a portion of a digital item that has been sent to the client device from the server system 702. For example, when content of an eBook is sent to a client device, the presence information module 824 may generate presence information indicating that a user of the client device is associated with that content of the eBook. The presence information module 824 may determine a user currently operating the client device based on login information accessible to the server system 702 and/or based on user profile data included in the user profile information database 714.

In another embodiment, the presence information module 824 may determine presence information of a user of a client device based on content of a digital item streamed to the client device. To illustrate, the presence information module 824 may track an amount of time that content of a digital item has been streamed to a client device relative to a total running time of the digital item and periodically update the presence information as the content of the digital item continues to stream to the client device. In an example, the presence information module 824 may determine that video content of a movie has been streamed to a client device for a particular amount of time and generate presence information indicating the amount of time that the video content has been streaming to the client device. Further, the presence information module 824 may receive presence information from one or more client devices and store the received presence information in the presence information database 712. The presence information module 824 may also send a request to a client device to retrieve presence information associated with a user of the client device. The presence information module 824 may send the request for presence information to the client device periodically. In addition, the presence information module 824 may send one or more requests for presence information to a client device in response to a specified event, such as downloading content of a digital item to the client device. The presence information module 824 may also receive a request for presence information associated with a particular client device user and provide the presence information to the requesting client device. For example, in response to receiving a request for presence information associated with a particular client device user, the presence information module 824 may search the presence information database 712 to identify the presence information associated with the particular user and send the presence information to the requesting client device. In one illustration, a member of a social networking group may send a request to the presence information module 824 to identify songs of a particular album that the other members of the social networking group have accessed or are currently accessing.

The user identification request module 826 may be configured to receive a user identification request from a client device to identify one or more users of additional client devices. In some instances, the users of the additional client devices are associated with a similar portion of a digital item as a user of the client device sending the user identification request. Additionally, the user identification request may relate to identifying each of the client device users associated with the portion of the digital item specified in the presence information request. Alternatively, the user identification request may relate to filtering or searching for client device users that match criteria specified in the user identification request. In one example, the user identification request module 826 may receive a user identification request to identify users of additional client devices that are reading the same chapter of an eBook as the user of the requesting client device and that are between the ages of 25 and 29 living in Los Angeles, Calif.

After receiving a user identification request, the user identification request module 826 is configured to access the presence information database 712, the user profile information database 714, or a combination thereof, to generate user identification results. In one embodiment, the user identification request module 826 may identify presence information associated with a user of the requesting client device based on presence information stored in the presence information database 712 and then identify other users that are associated with similar presence information. For example, the user identification request module 826 may determine that a user of a requesting client device is associated with a particular page or word count of an eBook and identify users of other client devices that are also associated with the same page or word count of the eBook. In another example, a user of a requesting client device may be associated with a certain running time of an audio book, such as 1:54:05, and the user identification request module 826 may identify other client device users associated with a similar portion of the audio book. A user of a client device may be associated with a particular portion of a digital item when the user of the client device is currently viewing or listening to particular content of the digital item. Additionally, a user of a client device may be associated with a particular portion of a digital item when a particular page of an eBook or audio book has been marked by the user or marked by the client device. A client device may mark a particular portion of a digital item when the client device is shutting down, before the client device moves into another state, such as entering a sleep mode, when a digital item accessing application is closing (e.g. media playback application or eBook viewing application), or a combination thereof.

The user identification request module 826 may also match criteria specified in the user identification request with user profile data associated with client device users that are associated with the same portion of a digital item as the user submitting the user identification request. After identifying the users that match the criteria of the user identification request, the user identification request module 826 may be configured to generate the user identification results and send the user identification results to the requesting client device. The user identification results may include identifiers of the users matching the criteria of the user identification request, identifiers of the client devices associated with the matching users, personal information of the users, geographic information of the users, other communication information associated with the users, such as email addresses, information indicating availability of a particular user to communicate, or a combination thereof. The geographic location information of particular users may be based on information accessible via the server system 702, such as geographic positioning system (GPS) data of a client device associated with a particular user, an Internet Protocol (IP) address of a client device associated with a particular user, user profile data indicating a residence of a particular user, data received from one or more components of a wide area wireless communication network indicating a geographic position of a client device associated with a particular user, or a combination thereof.

The user identification request module 826 may determine availability of a user to communicate based on data stored in the user profile information database 714. In an example, a user's profile may specify that the user only wants to communicate with other specified users, users included in one or more groups, or a combination thereof. An example of a user interface configured to enter availability information is shown in FIG. 6. When the user identification request module 826 retrieves user profile information from the user profile database 714, the user identification request module 826 may determine if the user of the requesting client device is within an acceptable distance from the requested user through a social network graph, and indicate the availability to communicate in the user identification results based on this user profile information. An availability to communicate for a user may also be determined based on whether or not a client device associated with the user is online and/or connected to a network.

The user identification request module 826 may monitor presence information received at the server system 702 to identify a user of an additional client device associated with a particular portion of a digital item in response to receiving a user identification request. For example, after receiving a user identification request, the user identification request module 826 may periodically search presence information stored in the presence information database 712 to determine whether any new presence information indicates a user of a client device that has become associated with the portion of the digital item specified in the user identification request. To illustrate, the user identification request module 826 may receive a user identification request relating to specified content of an eBook. After providing the user identification results for the user identification request, the user identification request module 826 may search the presence information database 712 to identify other users of client devices that have recently displayed the specified content of the eBook. The user identification request module 826 may monitor for users of additional client devices for a specified period of time or as long as the user submitting the user identification request remains associated with the specified content of the eBook.

Additionally, a user identification request may include an alert for the server system 702 to notify a user submitting the user identification request when an additional client device has become associated with a designated portion of a digital item. For example, the user identification request module 826 may receive an alert to notify a user of a requesting client device when users of additional client devices begin viewing designated content, such as a page number or chapter, of an eBook and in turn, the user identification search request module 826 sends a corresponding notification to the requesting client device. The designated portion of the digital item may have already been viewed by a user of the requesting client device or the designated portion of the digital item may not yet have been viewed by the user of the requesting client device. Receipt of a notification may be indicated on a user interface of the requesting client device via an icon, pop-up message, or a combination thereof. In addition, the notification may be included in an email, page, text message, voice mail, or a combination thereof, and the notification may be sent to multiple client devices associated with a particular client device user.

The user identification request module 826 may also receive a user identification request from a particular client device before content related to a digital item has been sent to the particular client device. In this instance, the user identification request module 826 may continuously identify users of additional client devices that satisfy the user identification request as a user of the particular client device progresses through the content of a digital item. For example, after receiving an initial user identification request, the user identification search request module 826 may determine if the presence information associated with the particular client device has changed. Continuing with this example, when the user identification request module 826 determines that the presence information of the particular client device has changed (e.g., a user of the particular client device has turned the page of an eBook, or otherwise viewed different content of the eBook), the user identification request module 826 may identify users of client devices satisfying the user identification request that are associated with the updated presence information. The user of the particular client device can selectively disable and enable the user identification search results updates.

The annotations module 828 may be configured to receive annotations submitted via one or more client devices and store the annotations in the annotations database 716. The annotations may be related to digital items stored at the digital items database 710, such as an eBook, audio content, video content, or a combination thereof. Additionally, the annotations module 828 may be configured to receive an annotations request from a client device to provide annotations relating to a particular portion of a digital item that have been submitted by certain users of client devices included in user identification search results. In response to receiving the annotations request, the annotations module 828 may retrieve any annotations submitted by the specified users that are associated with the particular portion of the digital item from the annotations database 716 and send those annotations to the requesting client device.

Illustrative Client System

Figure 9:
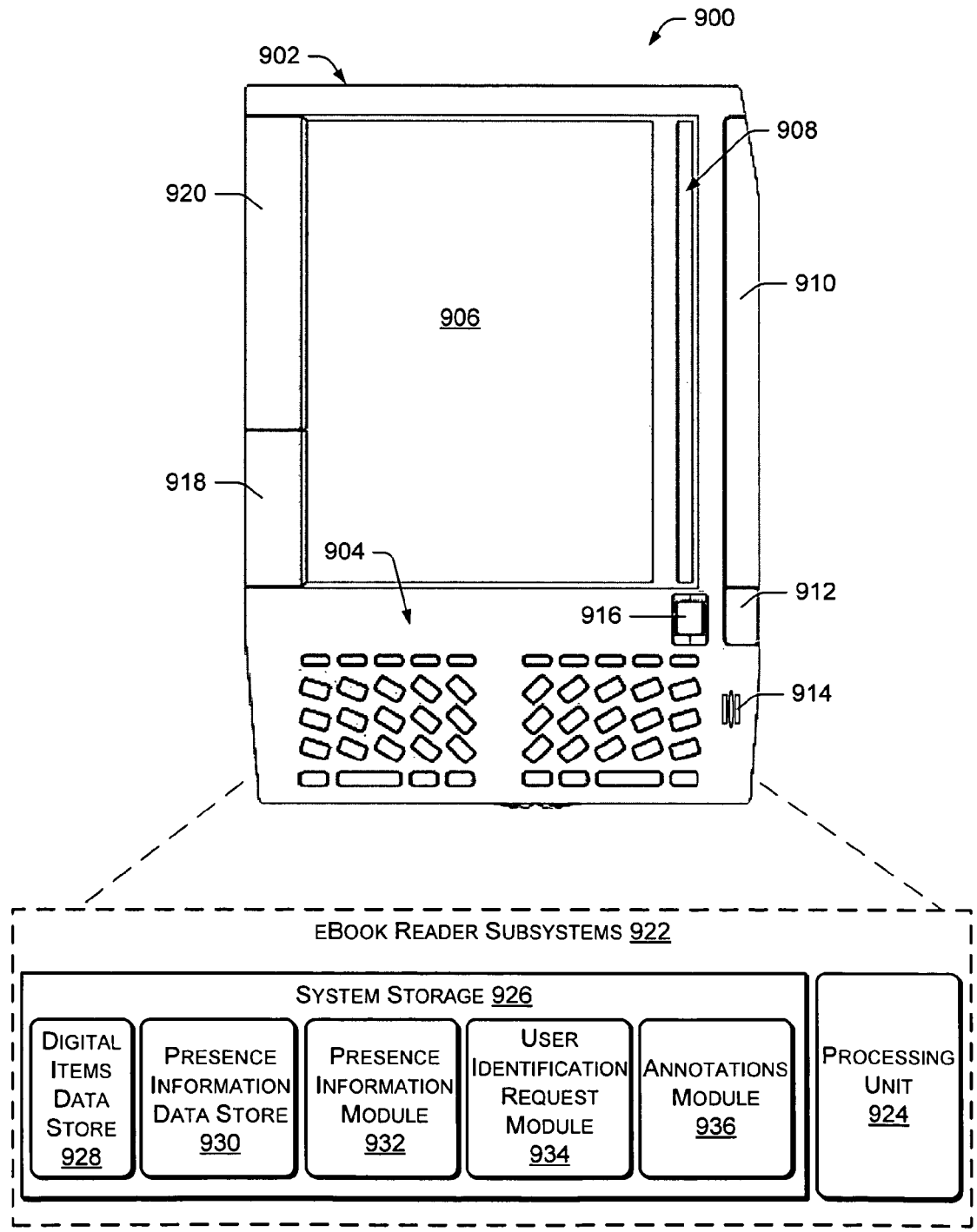
FIG. 9 is a pictorial diagram of an illustrative client device that may be used in the computing environment of FIG. 7.

FIG. 9 is a pictorial diagram of an illustrative client system in the form of an electronic reader device 900 that may be used with the computing environment of FIG. 7. However, virtually any other type of client device may be used to provide presence information of digital items. The electronic reader device 900 allows users engaging in a common activity, such as reading the same eBook, to connect and communicate with one another regarding the common activity and possibly other subjects, as well.

The electronic reader device 900 includes a body or housing 902, a keyboard 904, and a dual display system comprised of a first display 906 and a second display 908. The keyboard 904 includes a plurality of alphabetic, numeric, and/or function keys for entry of user input.

The first display 906 in the dual display system presents content in a human-readable format to the user. The content presented in the first display 906 may be digital items, such as electronic books, newspapers, or other readable or viewable materials. For example, the first display 906 provides the text of the electronic books and also depicts any illustrations, tables, or graphic elements that might be contained in the electronic books.

The second display 908 of the dual display system is a narrow screen located adjacent to the first display 906. The second display 908 is illustrated as being positioned to the right of the first display 906, although it may be located elsewhere in the housing 902 in other implementations. The second display 908 may be responsive to user input registered via, for example, a finger, a stylus, or other similar pointing device. Additionally, the second display 908 may enable presentation of graphic elements that correspond to content displayed in the first display 906.

The electronic reader device 900 may also include a variety of user input devices 910-920 to navigate through and among eBooks and digital items. Examples of user input devices 910-920 include buttons, scroll wheels, thumb wheels, thumb sticks, sensors that detect and register movement of a user's thumb or finger, tactile sensors, or any other conventional user input mechanism.

The electronic reader device 900 also has various internal components, which are referred to generally as electronic reader subsystems 922. In one implementation, the electronic reader subsystem 922 includes system storage 926 and a processing unit 924. The processing unit 924 interacts with the system storage 926 to facilitate operation of the electronic reader device 900. The system storage 914 may include volatile memory (such as RAM), nonvolatile memory, removable memory, and/or non-removable memory, implemented in any method or technology for storage of information, such as computer-readable instructions, data structures, program modules, or other data. Also, the processing unit 924 may include onboard memory in addition to or instead of the system storage 926. Some examples of storage media that may be included in the system storage 926 and/or processing unit 924 include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the electronic reader device 900. Any such computer storage media may be part of the electronic reader device 900.

The system storage 926 may include a digital items data store 928 and a presence information data store 930. The digital items data store 928 may include one or more digital items received from a server system, such as the server system 702 in FIG. 7 and FIG. 8. For example, the electronic reader device 900 may be configured to download electronic versions of books from a server system and store the data associated with the electronic versions of the books in the digital items data store 928. The presence information data store 930 may include presence information associated with digital items stored in the digital items data store 928. In one example, the presence information may indicate a portion of text of an eBook shown on the first display 906. In another example, the presence information may indicate a portion of text of an eBook that was shown on the first display 906 before the electronic reader device 900 was shut down or went into a sleep or hibernation mode. In a further example, the presence information may indicate a portion of text of an eBook that has been associated with a marker based on an input of a user of the client device (i.e. an electronic book mark).

In an illustrative embodiment, the presence information data store 930 stores presence information associated with one or more users of the electronic reader device 900. For example, the presence information data store 930 may store presence information relating to a location of a number of different users within the same eBook. To illustrate, the presence information data store 930 may store presence information indicating that one user of the electronic reader device 900 may have placed an electronic book mark at one portion of the novel *To Kill a Mockingbird* and also store presence information indicating that another user of the electronic reader device 900 is currently viewing another portion of the same novel. In another illustrative embodiment, the presence information data store 930 may store presence information for a number of different digital items associated with a particular user of the electronic reader device 900. For example, the presence information data store 930 may store presence information indicating that a user of the electronic reader device 900 has placed an electronic book mark at a portion of the novel, *The Firm* and is currently viewing a portion of the current issue of the magazine, *The New Yorker*, via the first display 906.

The system storage 926 also includes a number of modules 932-936 related to providing presence information within digital items. The presence information module 932 may be configured to generate presence information for a portion of a digital item accessed via the electronic reader device 900. For example, the presence information module 932 may generate presence information based on a portion of an eBook displayed on the first display 906. In another example, the presence information module 932 may generate presence information based on an electronic book mark associated with a portion of an eBook by an input of a user via one or more of the user input devices 910-920. Further, the presence information module 932 may generate presence information for a digital item by detecting a portion of the digital item shown via the first display 906 when the electronic reader device 900 is being shut down, entering a sleep mode, or entering a screen saver mode.

The presence information module 932 may also be configured to store presence information locally and/or send the presence information to a server system, such as the server system 702 of FIGS. 7 and 8, for remote storage. In one embodiment, the presence information module 932 is configured to send presence information of a portion of a digital item to the server system in response to a portion of the digital item being provided to the first display 906. Further, the presence information module 932 may continuously update the presence information of a digital item when each additional portion of a digital item is provided to the first display 906 and the presence information module 932 may automatically send the updated presence information indicating the additional portion of the digital item to the server system. In an example, each time that a user views different content of an eBook, such as a new page, the presence information module 932 may generate updated presence information that indicates the new content and forward the updated presence information to the server system.

Additionally, the presence information module 932 may be configured to receive requests from a server system, another client device, or a combination thereof, for presence information associated with a digital item accessed by a particular user of the electronic reader device 900. In response to receiving a request for presence information, the presence information module 932 may be configured to retrieve the requested presence information from the presence information data store 930 and send the retrieved presence information to the requesting server system and/or client device. In one example, the electronic reader device 900 may participate in a peer-to-peer distributed networking model, where presence information associated with a number of electronic reader devices is stored at each member of the peer-to-peer network and each member of the peer-to-peer network stores information indicating the presence information stored at the other members of the peer-to-peer network. In this example, the electronic reader device 900 may receive requests from other members of the peer-to-peer network for presence information stored in the presence information data store 930 that is associated with various other members of the peer-to-peer network.

Further, the presence information module 932 may be configured to send a request to an additional client device or a server system, such as the server system 702 of FIG. 7 and FIG. 8, for presence information associated with one or more users of additional electronic reader devices, or other client devices. For example, a user of the electronic reader device 900 may want to identify a portion of an eBook associated with at least one other client device user to monitor the progress of the other client device users with respect to the eBook.

The user identification request module 934 may be configured to generate a user interface to enter a user identification request to identify one or more users of a plurality of client devices that are associated with a particular portion of a digital item. The user interface may include one or more fields and options to specify criteria of a user identification request. An example of a user interface to enter a user identification request is shown in FIG. 2 and in FIG. 4. The user identification request module 934 may also be configured to send the user identification request to a server system, such as the server system 702 of FIG. 7 and FIG. 8, to send the user identification request to an additional client device, or a combination thereof.

A user identification request may be entered before a user of the electronic reader device 900 begins reading a particular eBook. In one example, the user identification request may be entered during the process of purchasing and downloading a particular eBook. Entering a user identification request before a user of the electronic reader device 900 begins reading a particular eBook may indicate a request to receive continuous updates to the corresponding user identification results as the user progresses through the particular eBook. Further, a user of the electronic reader device 900 may enter a user identification request at any time while reading a particular eBook, whether or not a user identification request has already been submitted. In some instances, a user of the electronic reader device 900 may submit multiple user identification requests related to a particular eBook or related to a particular portion of an eBook, with each of the user identification requests specifying different criteria. Additionally, a particular user identification request may be automatically sent to a server system when the electronic reader device 900 switches from providing one portion of a digital item to the first display 906 to providing another portion of the digital item to the first display 906. For example, the user identification request module 934 may send a repeat of a previous user identification request when a user turns a page of an eBook.

The user identification request module 934 may be configured to receive user identification results indicating users of client devices associated with a particular portion of a digital item. In some instances, the user identification results may be received in response to a user identification search request or user identification filter request, thus the user identification results indicate client device users matching criteria specified in the respective user identification request. The user identification results may be received from a server system and/or an additional client device. The user identification request module 934 may also be configured to provide a user interface including the user identification results. An example of a user interface including user identification results is illustrated in FIG. 1 and in FIG. 5.

The user identification results may include an identifier of the client device users satisfying the user identification request. The user identification results may also include availability information relating to the availability of the users specified in the user identification results to communicate with a user of the electronic reader device 900 via a network. In an alternative embodiment, the user identification request module 934 may determine availability of client device users to communicate with a user of the electronic reader device 900. For example, user identification results received at the electronic reader device 900 may include client device identifiers, such as IP addresses, or another identifier (e.g. phone number) of client devices associated with users specified in the user identification results. The user identification request module 934 may be configured to attempt to establish a brief connection with the client devices using the client device identifiers. When the electronic reader device 900 is able to establish a brief connection with a particular client device, the user identification request module 934 may indicate in a user interface that a user of the particular client device is available to communicate with a user of the electronic reader device 900. Further the user identification request module 934 may indicate in the user interface that a user of the particular client device is not available to communicate with a user of the electronic reader device 900 when the electronic reader device 900 is not able to establish a communication link with the particular client device.

The annotations module 936 may be configured to provide an annotations user interface to enter annotations related to a digital item being viewed via the electronic reader device 900. The annotations module 936 may also be configured to provide a user of the electronic reader device 900 the option of sending the annotation to be stored at a remote data store, such as the annotations database 716 of FIG. 7 and FIG. 8, the option of storing an annotation locally at an annotations data store (not shown), or any combination thereof. Further, the annotations module 936 may be configured to generate an annotations request and send the annotations request to a server system to retrieve annotations submitted by a user specified in user identification search results.

In addition to the features shown in FIG. 9, the electronic reader device 900 may include a network interface that enables communication with other computing devices such as the server system 702 of FIG. 7 and FIG. 8, with another client device, or a combination thereof. Wired or wireless network connections may be used with any suitable communication protocol, such as TCP/IP. For example, the network interface may be configured to send presence information to a server system and to send a user identification request to a server system. Further, the system storage 926 of the electronic reader device 900 may store an application for browsing web pages.

Illustrative Methods

FIGS. 10-13 include flow diagrams of illustrative methods of providing presence information associated with a digital item and identifying client device users associated with a particular portion of a digital item based on presence information associated with the respective client device users. The methods of FIGS. 10-13 may, but need not necessarily, be implemented using the server system 702, one or more of the client devices 704 and 706, and/or the electronic reader device 900 shown in FIGS. 7, 8, and 9.

Figure 10:
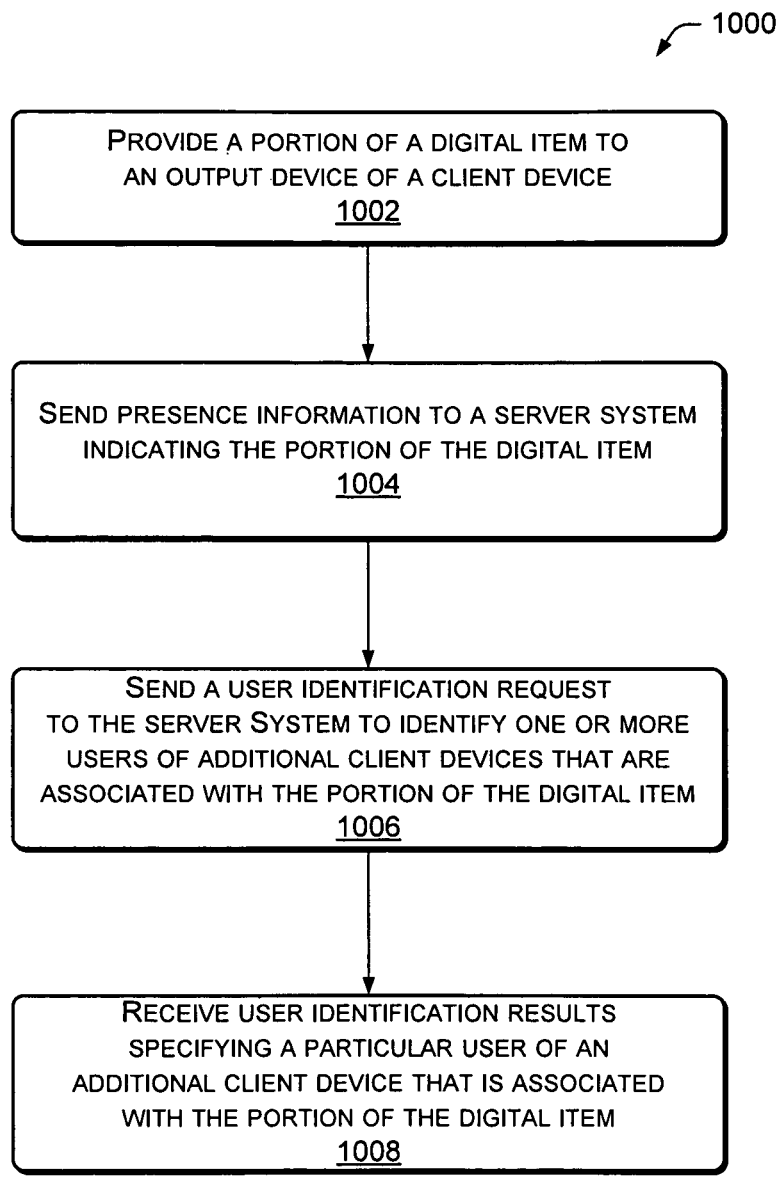
FIG. 10 is a flow diagram of an illustrative method of receiving user identification results including an identifier of a user of a particular client device that is associated with the same portion of a digital item as a user of a requesting client device.

FIG. 10 is a flow diagram of an illustrative method 1000 of receiving user identification results specifying that a user of a particular client device is associated with the same portion of a digital item as a user of a requesting client device. In this particular implementation, the method 1000 begins at block 1002 with providing a portion of a digital item to an output device of a client device. In one example, certain text of an eBook may be provided to a display of an electronic reader device, such as a particular page or number of lines. Moving to 1004, presence information may be sent to a server system from a client device indicating the portion of the digital item provided to the output device of the client device. Continuing with the above example, the presence information sent to the server system would indicate the page or lines of text provided to the display of the electronic reader device.

Proceeding to 1006, a user identification request is sent from a client device to the server system to identify one or more users of additional client devices that are associated with the portion of the digital item. Thus, the user identification request is directed to identifying users of other client devices that are reading, listening to, or watching the same content as the user of the client device sending the user identification request. The user identification request may specify a number of criteria to filter the users associated with the same portion of the digital item as the user of the requesting client device. To illustrate, the user identification request may indicate a request to identify users of a particular group, such as a book group, social networking group, or educational group. In another illustration, the user identification request may indicate a request to identify users having a particular demographic profile that are also reading the same portion of the digital item as the user of the client device, such as users living in a particular geographic region and of a particular age. At 1008, user identification results are received from the server system. The user identification results specify a particular user of an additional client device that is associated with the same portion of the digital item as the user that submitted the user identification request. In addition, the particular user matches the criteria, if any, specified in the user identification request.

Figure 11:
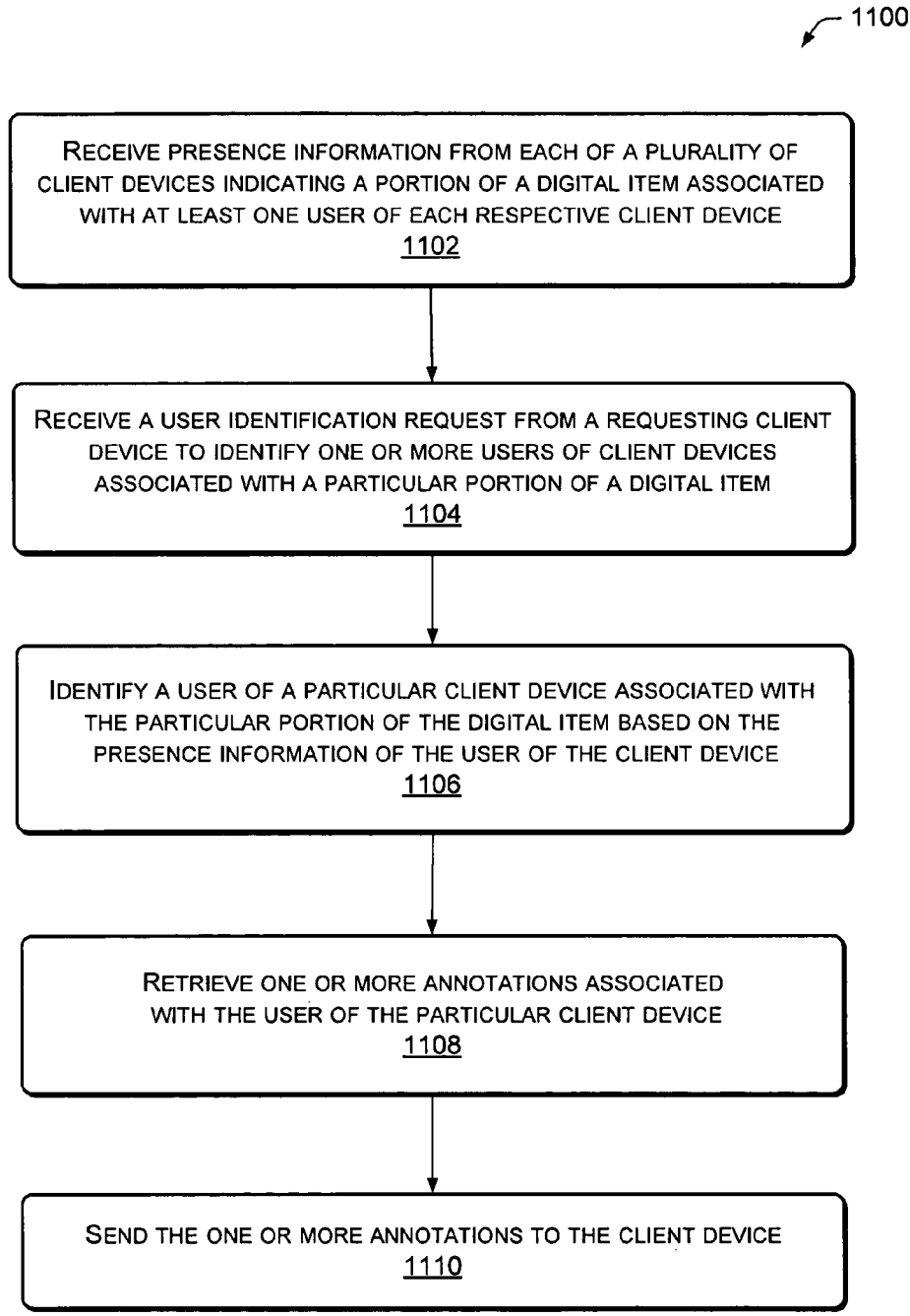
FIG. 11 is a flow diagram of an illustrative method of providing annotations associated with a particular user of a client device that is associated with a particular portion of a digital item.

FIG. 11 is a flow diagram of an illustrative method 1100 of providing annotations associated with a particular user of a client device that is associated with a particular portion of a digital item. The method 1100 begins at 1102 with receipt of presence information from each of a plurality of client devices. The presence information indicates a portion of a digital item associated with one or more users of each respective client device. Moving to 1104, a user identification request is received at the server system from a requesting client device to identify one or more users of client devices associated with a particular portion of a digital item. For example, a user of the requesting client device may submit a user identification request to identify others that are reading a similar portion of an eBook.

Proceeding to 1106, a user of a particular client device is identified that is associated with a particular portion of the digital item based on the presence information of the user of the client device. To illustrate, a server system may search a database, such as a presence information database 712 of FIG. 7 and FIG. 8, for client device users associated with the particular portion of the digital item. In some instances, the server system may search the database for users of client devices matching criteria specified in the user identification request. At 1108, one or more annotations associated with the user of the particular client device are retrieved from an annotations database, such as the annotations database 716 of FIG. 7 and FIG. 8. Moving to 1110, the one or more annotations are sent to the requesting client device.

Figure 12:
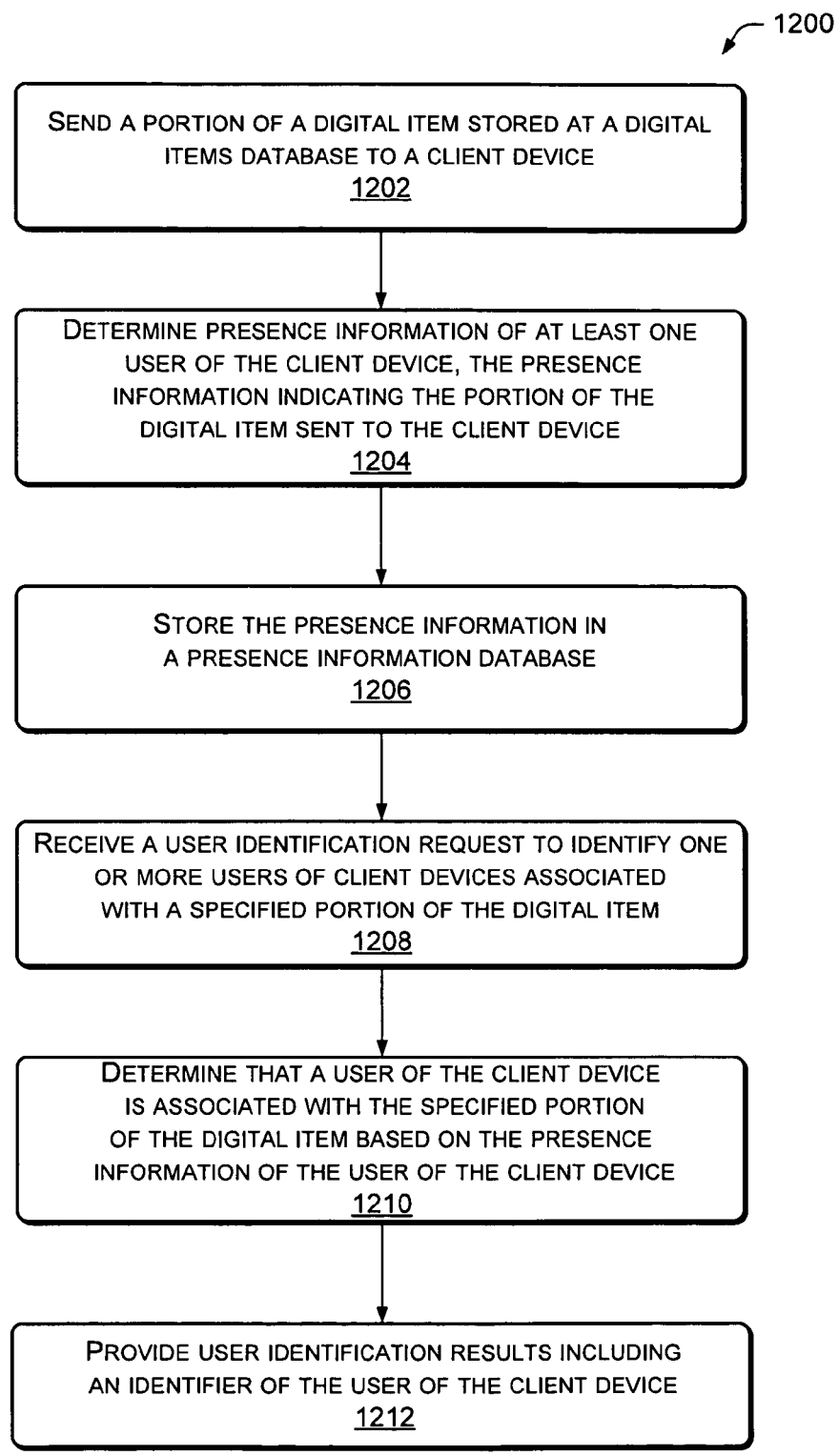
FIG. 12 is a flow diagram of an illustrative method of determining whether a user of a client device is associated with a specified portion of a digital item based on a portion of a digital item sent to the client device.

FIG. 12 is a flow diagram of an illustrative method of determining whether a user of a client device is associated with a specified portion of a digital item based on a portion of a digital item sent to the client device. The method 1200 begins at 1202 by sending a portion of a digital item stored at a digital items database, such as the digital items database 710 of FIG. 7 and FIG. 8, to a client device. In an example, the portion of the digital item sent to the client device may include content of an eBook or a song of an album. The portion of the digital item sent to the client device may also relate to content being streamed to the client device. Moving to 1204, presence information of at least one user of the client device is determined. The presence information indicates the portion of the digital item sent to the client device. To illustrate, the presence information may indicate the portion of a digital item that is being streamed to the client device and viewed by a particular user of the client device. Additionally, the presence information may indicate content of an eBook that has most recently been sent to the client device from the digital items database. Proceeding to 1206, the presence information is stored in a presence information database, such as the presence information database 712 of FIG. 7 and FIG. 8.

At 1208, a user identification request is received to identify one or more users of client devices associated with a specified portion of the digital item. In one embodiment, the user identification request may be received from a client device via a network. In another embodiment, the user identification request may be received from a computing device coupled to the server system, such as a personal computer or a laptop computer operated by a system administrator. Moving to 1210, the server system determines that the user of the client device is associated with the specified portion of the digital item based on the presence information of the user of the client device. For example, the server system may determine that a user of the client device is associated with particular content of an eBook based on the portion of the eBook most recently sent to the client device. Proceeding to 1212, the server system provides user identification results. The user identification results include an identifier of the user of the client device. The user identification results may be provided to the client device or computing device that sent the user identification request. The identifier of the user of the client device may include a user specified identifier, an identifier assigned by a system administrator, or a combination thereof.

Figure 13:
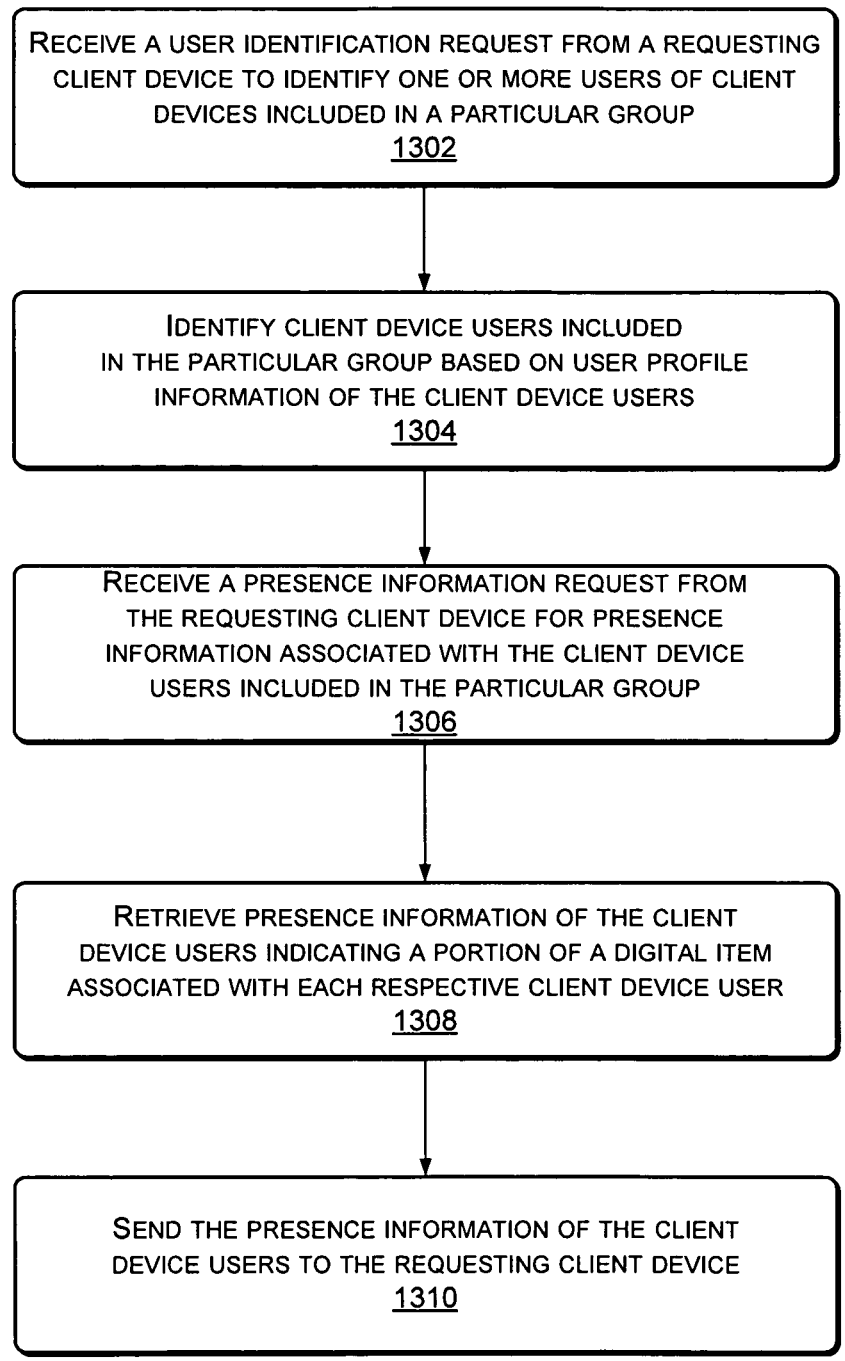
FIG. 13 is a flow diagram of an illustrative method of retrieving presence information of a user of a client device based on whether or not a user of the client device is a member of a particular group.

FIG. 13 is a flow diagram of an illustrative method 1300 of retrieving presence information of a client device based on whether or not a user of the client device is a member of a particular group. The method 1300 begins at 1302 with receiving a user identification request from a requesting client device to identify one or more users of client devices included in a particular group. The user identification request may relate to a group that includes a user of the requesting client device, such as a book club, educational group, such as a high school class or college class, or a social networking group. Moving to 1304, a server system identifies client device users included in the particular group based on user profile information of the client device users.

Advancing to 1306, a presence information request is received from the requesting client device for presence information associated with the client device users included in the particular group. The presence information request may be submitted separately from the user identification request or may be included in the user identification request. Proceeding to 1308, presence information of the client device users is retrieved. The presence information indicates a portion of a digital item associated with each respective client device user. For example, the presence information may indicate content of an eBook that is currently being viewed by a user of a respective client device. In another example, the presence information may indicate an electronic book mark of a page or portion of text that was previously viewed via a display of a respective client device. Moving to 1310, the presence information of the client device users is sent to the requesting client device.

While several implementations have been illustrated and described above, it will be appreciated that various changes can be made therein and that the scope of the implementations should be determined from the following claims and equivalents thereto.

Certain drawings illustrate features by showing various logic, modules, components, functionality, and so forth. The terms "logic," "module," "component," "functionality" and the like generally represent hardware, software, firmware, or any combination of these elements, or yet some other kind of implementation. The term "computer-readable media" refers to any kind of media capable of retaining information in any form readable by a computer or other machine, including various kinds of storage devices (magnetic, optical, static, etc.). Various instructions, methods and techniques described herein may be considered in the general context of computer-readable storage media including computer-executable instructions, such as program modules, executed by one or more computers or other devices. The computer-executable instructions include routines, programs, objects, components, data structures, etc. for performing particular tasks or implementing particular abstract data types. The computer-executable instructions may be executed as native code or may be downloaded and executed, such as in a virtual machine or other just-in-time compilation execution environment. Typically, the functionality of the computer-executable instructions may be combined or distributed as desired in various implementations.

Other figures illustrate features in signal diagram form and/or flowchart form. In this mode of explanation, certain operations are described as constituting distinct tasks performed in a certain order. Such implementations are illustrative and non-limiting. Separate operations described in these figures may be grouped together and performed in a single operation, while certain single operations may be performed in multiple parts. Certain operations may be performed in an order different from the order illustrated in the figures. Certain operations may be performed by different agents than those identified in the figures. The operations shown in the figures may be implemented by software, firmware, hardware, manual processing, or other form, or by any combination of these forms.

In general, the various features described in the implementations may be regarded as optional features, meaning that these features may be omitted or replaced with other features. Further, the various implementations described herein may be supplemented by adding additional features.

What is claimed is:

1. A computer-implemented method comprising:
receiving presence information from a client device, the presence information indicating a portion of a digital text that is currently being displayed on the client device;
receiving a user identification request from the client device, the user identification request to determine a group of users associated with other client devices that are concurrently displaying at least part of the portion of the digital text that is currently being displayed on the client device, the user identification request including a user-selected search criterion that is provided while the portion of the digital text is currently being displayed on the client device;
determining the group of users associated with the other client devices that are concurrently displaying at least the part of the portion of the digital text that is currently being displayed on the client device, the determining based on other presence information received from the other client devices;
using the user-selected search criterion to identify a user from the group of users;
receiving, from the client device, a request for one or more content annotations, the one or more content annotations provided by the identified user via one of the other client devices and the one or more content annotations being related to the portion of the digital text; and
providing, to the client device, the one or more content annotations.

2. The computer-implemented method of claim 1, further comprising monitoring the other presence information received from the other client devices to determine the group of users.

3. The computer-implemented method of claim 2, further comprising monitoring the other presence information for a specified period of time.

4. The computer-implemented method of claim 2, further comprising monitoring the other presence information during a period of time when the portion of the digital text is currently being displayed on the client device.

5. The computer-implemented method of claim 1, further comprising providing availability information to the client device specifying whether the identified user is available to communicate with a user of the client device.

6. The computer-implemented method of claim 5, wherein availability of the identified user is based on user profile information.

7. The computer-implemented method of claim 5, wherein availability of the identified user is based on membership in a group including the user of the client device.

8. The computer-implemented method of claim 5, wherein availability of the identified user is based on a connection of the one of the other client devices to a network.

9. The computer-implemented method of claim 1, further comprising providing geographic location information to the client device, the geographic location information specifying a geographic location of the identified user.

10. The computer-implemented method of claim 9, wherein the geographic location information is based on geographic positioning system (GPS) data, an Internet Protocol (IP) address of the one of the other client devices, user profile information, data received from one or more components of a wide area wireless communication network, or a combination thereof.

11. An electronic reader device comprising:
    a display;
    a processing unit; and
    a memory device accessible to the processing unit, the memory device including one or more modules that, when executed by the processing unit, causes the processing unit to perform actions including:
        determining a first portion of text of an electronic book that is being displayed on the display;
        providing, to a server, a request to identify a group of users of other client devices that are displaying at least a portion of the first portion of text on displays of the other client devices, wherein the request includes a user-selected search criterion that is received while the first portion of text of the electronic book is being displayed on the display and that is useable to identify a user from the group of users;
    receiving an identification of the user of one of the other client devices that is displaying at least the portion of the first portion of text and that satisfies the user-selected search criterion; and
    receiving one or more content annotations provided by the user of the one of the other client devices, wherein the one or more content annotations are related to the first portion of text being displayed on the display.

12. The electronic reader device of claim 11, wherein the actions performed by the processing unit further include providing the request to the server in response to the electronic reader device switching from providing a previous portion of text of the electronic book to the display to providing the first portion of text of the electronic book to the display.

13. The electronic reader device of claim 11, wherein the group of users includes a book club, a social networking group, an educational class, or a combination thereof.

14. The electronic reader device of claim 11, wherein the user-selected search criterion specifies that the user of the one of the other client devices be associated with one or more demographic criteria.

15. One or more non-transitory computer-readable storage media including computer executable instructions that, when executed by a computer, perform acts comprising:
    downloading, by a client device, a digital item from a server system of a network service;
    storing, by the client device, the digital item in a digital items data store of the client device;
    receiving a request at the client device from the server system to provide presence information of the client device;
    sending the presence information of the client device to the server system in response to receiving the request from the server system, the presence information specifying a portion of the digital item that is currently being output by the client device;
    receiving a user-selected search criterion while the portion of the digital item that is currently being output by the client device, the user-selected search criterion being useable to identify a user of another client device from a group of users of other client devices that are outputting at least part of the portion of the digital item that is currently being output by the client device;
    sending, to the server system, the user-selected search criterion; and
    receiving one or more content annotations that have been provided via the other client device and by the user identified using the user-selected search criterion, wherein the one or more content annotations are related to the portion of the digital item that is currently being output by the client device.

16. The one or more non-transitory computer-readable storage media of claim 15, wherein the acts further comprise:
    providing a user interface specifying a plurality of additional client device users and a respective portion of the digital item being viewed by individual client device users of the plurality of additional client device users;
    receiving a selection indicating a particular additional client device user that is viewing a respective portion of the digital item that is different from the portion of the digital item being output by the client device; and
    synchronizing the portion of the digital item being output by the client device with the different portion of the digital item that is being viewed by the particular additional client device user by updating a display of the client device to include the different portion of the digital item.

17. The one or more non-transitory computer-readable storage media of claim 15, wherein the acts further comprise providing a user interface including a number of options to specify availability information of a user of the client device.

18. The one or more non-transitory computer-readable storage media of claim 17, wherein the availability information indicates:
    that the user of the client device is available to communicate with the identified user of the other client device;
    that the user of the client device is not available to communicate with the identified user of the other client device; or
    that the presence information is not to be sent to the identified user of the other client device.

19. The one or more non-transitory computer-readable storage media of claim 15, wherein the acts further comprise providing a user interface including an identifier of an author of the digital item, an indicator specifying availability of the author to communicate with a user of the client device, or a combination thereof.

20. A computer-implemented method comprising:
receiving presence information from each of a plurality of client devices, the presence information indicating a location of an electronic book that is currently being output to a user on a respective client device of the plurality of client devices;
receiving a user identification request from a requesting client device, the user identification request to determine a group of users associated with a group of client devices of the plurality of client devices that are outputting a first portion of text of the electronic book that overlaps a second portion of text of the electronic book currently being output on the requesting client device, the user identification request including a user-selected search criterion that is provided while the second portion of text of the electronic book is currently being output on the requesting client device and that is useable to identify a user from the group of users;
using the user-selected search criterion to identify the user from the group of users, the user being associated with a particular client device from the group of client devices that are outputting the first portion of the text of the electronic book that overlaps the second portion of text of the electronic book currently being output on the requesting client device; and
providing, to the requesting client device, one or more content annotations, wherein the one or more content annotations are provided by the identified user associated with the particular client device and are related to the first portion of text of the electronic book that overlaps the second portion of text of the electronic book currently being output on the requesting client device.

21. The computer-implemented method of claim 20, further comprising:
receiving the one or more content annotations from the particular client device.

22. The computer-implemented method of claim 20, further comprising monitoring the presence information to determine the group of users associated with the group of client devices that are outputting the first portion of the text of the electronic book that overlaps the second portion of the text of the electronic book that is currently being output on the requesting client device at least partly in response to receiving the user identification request.

23. The computer-implemented method of claim 22, further comprising monitoring the presence information for a specified period of time.

24. The computer-implemented method of claim 22, further comprising monitoring the presence information during a period of time when the second portion of the text of the electronic book is being output on the requesting client device.

25. The computer-implemented method of claim 20, further comprising receiving a content annotation request from the requesting client device, wherein the one or more content annotations are provided to the requesting client device at least partly in response to receiving the content annotation request.

26. The computer-implemented method of claim 20, further comprising providing availability information to the requesting client device specifying whether the user of the particular client device is available to communicate with a user of the requesting client device.

27. An electronic reader device comprising:
a display configured to display a first portion of a digital text;
a processing unit; and
a memory device accessible to the processing unit, the memory device including:
one or more modules that, when executed by the processing unit, causes the processing unit to perform actions including:
receiving, while the first portion of the digital text is being displayed on the display, a user-selected search criterion that is useable to identify a user of another client device from a group of users of other client devices that are displaying a second portion of the digital text that overlaps with the first portion of the digital text;
providing a user identification request that includes the user-selected search criterion to identify the user of the other client device that is displaying the second portion of the digital text that overlaps with the first portion of the digital text;
receiving, based at least in part on the user-selected search criterion, user identification results specifying that the other client device is displaying the second portion of the digital text that overlaps with the first portion of the digital text; and
receiving one or more content annotations provided via the other client device, wherein the one or more content annotations are related to the second portion of the digital text that overlaps with the first portion of the digital text.

28. The electronic reader device of claim 27, wherein the actions performed by the processing unit further include sending the user identification request to a server system in response to the electronic reader device switching from providing the first portion of the digital text to the display or in response to the electronic reader device switching to providing the first portion of the digital text to the display.

29. The electronic reader device of claim 27, wherein the group of users includes a book club, a social networking group, an educational class, or a combination thereof.

30. The electronic reader device of claim 27, wherein the user-selected search criterion specifies that the user of the other client device be associated with one or more demographic criteria.

31. The electronic reader device of claim 27, wherein the user-selected search criterion specifies that the user of the other client device be of a same age group as a user that is associated with the electronic reader device.

* * * * *